United States Patent [19]

Iwasa et al.

[11] Patent Number: 6,141,650
[45] Date of Patent: *Oct. 31, 2000

[54] SALES DATA PROCESSING SYSTEM CAPABLE OF AUTOMATICALLY CALCULATING SALES TAXES

[75] Inventors: Satoshi Iwasa, Akishima; Kouji Fusano, Hannou; Yukinobu Imoto, Hamura, all of Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,530

[22] Filed: Jul. 14, 1997

[30] Foreign Application Priority Data

Jul. 15, 1996 [JP] Japan ................... 8-202794

[51] Int. Cl.$^7$ .................................... G06F 17/60
[52] U.S. Cl. ............................................. 705/19
[58] Field of Search ................................. 705/19

[56] References Cited

U.S. PATENT DOCUMENTS 3,944,801 3/1976 Montana .................... 705/19
3,946,217 3/1976 Tsujikawa et al. ............ 705/19
3,963,910 6/1976 Enomoto et al. ............. 705/19

Primary Examiner—Emanuel Todd Voeltz
Assistant Examiner—Thomas A. Dixon
Attorney, Agent, or Firm—Frishauf, Holtz, Goodman, Langer & Chick, P.C.

[57] ABSTRACT

A sales data processing system wherein an upper limit value, a lower limit value, and a tax amount are entered into a tax amount list. The upper limit value and the lower limit value define a predetermined range of sales amounts, and the tax amount is determined based on a sales amount defined within the predetermined range. Difference values are calculated between a presently entered one of the upper and lower limit values and a previously entered one of the upper and lower limit values, and the calculated difference values are stored in accordance with a calculation order. A first difference value series not having regularity is judged, and a second difference value series having regularity repeated in a predetermined pattern from a series of the stored difference values is also judged. A tax amount information table is formed which has a tax amount information pattern in which the first difference value series not having regularity is used as a non-cyclic portion and a first cycle of the second difference value series having regularity is used as a cyclic portion.

8 Claims, 22 Drawing Sheets

PLU MEMORY

| PLU CODE | TITLE | UNIT PRICE | TAX TABLE FLAG | SALES QUANTITY |
|---|---|---|---|---|
| 0001 | — | — | 1 | 3 |
| 0002 | — | — | 1 | 4 |
| 0003 | — | — | 0 | 5 |
| 0004 | — | — | 0 | 10 |
|  |  |  |  |  |

FIG.2

SETTING EXAMPLE OF TAX TABLE

| |
|---|
| HEADER PORTION |
| HEADER PORTION |
| 2 (QUANTITY OF NON-CYCLIC PATTERN) |
| 10 (BP0) |
| 14 (BP1) |
| 17 (BP2) |
| 17 (BP3) |
| 16 (BP4) |
| 17 (BP5) |
| 17 (BP6) |
| 16 (BP7) |

- Rows 1–2: HEADER PORTION
- Rows 3 (quantity) and 10 (BP0), 14 (BP1): NON-CYCLIC PORTION
- Rows 17 (BP2) through 16 (BP7): CYCLIC PORTION

FIG.3

| FROM | TO | TAX | BP |
|------|------|------|------|
| 0.00 | 0.10 | 0.00 | 10 |
| 0.11 | 0.24 | 0.01 | 14 |
| 0.25 | 0.41 | 0.02 | 17 |
| 0.42 | 0.58 | 0.03 | 17 |
| 0.59 | 0.74 | 0.04 | 16 |
| 0.75 | 0.91 | 0.05 | 17 |
| 0.92 | 1.08 | 0.06 | 17 |
| 1.09 | 1.24 | 0.07 | 16 |
| 1.25 | 1.41 | 0.08 | 17 |
| 1.42 | 1.58 | 0.09 | 17 |
| 1.59 | 1.74 | 0.10 | 16 |
| 1.75 | 1.91 | 0.11 | 17 |
| 1.92 | 2.08 | 0.12 | 17 |
| 2.09 | 2.24 | 0.13 | 16 |
| 2.25 | 2.41 | 0.14 | 17 |

TAX TABLE      BP BUFFER

FIG.4

PRINT HEADER
```
12-24-95
  1  12-34
1234  2070
```

PRINT INPUT DATA
```
0.00
0.10 ----- 0
0.11
0.24 ----- 1
0.25
0.41 ----- 2
0.42
0.58 ----- 3
0.59
0.74 ----- 4
0.75
0.91 ----- 5
0.92
1.08 ----- 6
1.09
1.24 ----- 7
1.25
1.41 ----- 8
1.42
1.58 ----- 9
1.59
1.74 ----- 10
1.75
1.91 ----- 11
1.92
2.08 ----- 12
2.09
2.24 ----- 13
2.25
```

PRINT END
```
12-24-95
```

INPUT SETTING RECIEPT

FIG.11

```
          1 2 - 2 4 - 9 5
             1   1 2 - 3 4              PRINT HEADER
          1 2 3 4   2 0 7 0
(FEED-R.)
                            X           CHECKING SYMBOL
(FEED-R.)
    0 1 2 6
        0. 00
        0. 10 - - - - - 0
        0. 11
        0. 24 - - - - - 1
        0. 25
        0. 41 - - - - - 2
        0. 42
        0. 58 - - - - - 3
        0. 59
        0. 74 - - - - - 4
        0. 75
        0. 91 - - - - - 5
        0. 92
        1. 08 - - - - - 6
        1. 09
        1. 24 - - - - - 7
        1. 25
        1. 41 - - - - - 8
        1. 42
        1. 58 - - - - - 9
        1. 59
        1. 74 - - - - - 10
(FEED-R.)                               BEING FED EVERY
        1. 75                           10 "TAX' VALUES
        1. 91 - - - - 11

(FEED-R.)
                                        PRINT END
     1 2 - 2 4 - 9 5                    OF SETTING
```

SETTING / CHECKING REPORT

FIG.13

TAX LIST TABLE : A

| FROM | TO | TAX |
|---|---|---|
| $0.00 | $0.17 | $0.00 |
| $0.18 | $0.50 | $0.01 |
| $0.51 | $0.83 | $0.02 |
| $0.84 | $0.16 | $0.03 |
| $1.17 | $1.50 | $0.04 |
| $1.51 | $1.83 | $0.05 |
| $1.84 | $2.16 | $0.06 |
| $2.17 | $2.49 | $0.07 |
| $2.50 | $2.83 | $0.08 |
| $2.84 | $3.16 | $0.08 |
| $3.17 | $3.49 | $0.09 |

| TO | TAX |
|---|---|
| $0.17 | $0.00 |
| $0.50 | $0.01 |
| $0.83 | $0.02 |
| $0.16 | $0.03 |
| $1.50 | $0.04 |
| $1.83 | $0.05 |
| $2.16 | $0.06 |
| $2.49 | $0.07 |
| $2.83 | $0.08 |
| $3.16 | $0.08 |
| $3.49 | $0.09 |

| FROM | TAX |
|---|---|
| $0.00 | $0.00 |
| $0.18 | $0.01 |
| $0.51 | $0.02 |
| $0.84 | $0.03 |
| $1.17 | $0.04 |
| $1.51 | $0.05 |
| $1.84 | $0.06 |
| $2.17 | $0.07 |
| $2.50 | $0.08 |
| $2.84 | $0.08 |
| $3.17 | $0.09 |

FIG.18C

FROM – TAX
(INPUT CONDITION : "TAX" VALUE IS INCREMENTED BY 1 ¢ )

| FROM | TO | PRECEDING TO | TAX | |
|---|---|---|---|---|
| 0.00 | | | 0.00 | |
| 0.11 | | 0.10 | 0.01 | SET "FROM" VALUE –1 ¢ TO PRECEDING "TO" VALUE |
| 0.25 | | 0.24 | 0.02 | |

BP (0) = PRECEDING "TO (10)" VALUE
BP (1) = PRESENT "TO" VALUE – ONE-PRECEDING "TO" VALUE

FIG.20A

ONLY "FROM" VALUE
(INPUT CONDITION : "TAX" VALUE IS INCREMENTED BY 1 ¢ )

| FROM | TO | PRECEDING TO | TAX | |
|---|---|---|---|---|
| 0.00 | | | | |
| 0.11 | | 0.10 | 0.01 | SET "FROM" VALUE –1 ¢ TO PRECEDING "TO" VALUE |
| 0.25 | | 0.24 | 0.02 | |

FROM – TAX
(INPUT CONDITION : NONE)

| FROM | TO | PRECEDING TO | TAX |
|------|------|------|------|
|  | 0.10 |  | 0.00 |
|  | 0.24 | 0.10 | 0.01 |
|  | 0.50 | 0.24 | 0.03 |

SET ONE-PRECEDING "TO" VALUE TO PRESENT PRECEDING "TO" VALUE

ONLY "TO" VALUE
(INPUT CONDITION : "TAX" VALUE IS INCREMENTED BY 1 ¢)

| FROM | TO | PRECEDING TO | TAX |
|------|------|------|------|
|  | 0.10 |  |  |
|  | 0.24 | 0.10 | 0.01 |
|  | 0.50 | 0.24 | 0.02 |

SET ONE-PRECEDING "TO" VALUE TO PRESENT PRECEDING "TO" VALUE

TAX LIST TABLE : A

| FROM | TO | TAX | TO VALUE ||  DIFFERENCE | PATTERN |
|---|---|---|---|---|---|---|
| | | | UPPER | LOWER | | |
| 0.00 | 0.10 | 0.00 | | | | |
| 0.11 | 0.24 | 0.01 | 10 − 0 = | | 10 | NON-CYCLIC |
| 0.25 | 0.41 | 0.02 | 24 − 10 = | | 14 | |
| 0.42 | 0.58 | 0.03 | 41 − 24 = | | 17 | CYCLIC |
| 0.59 | 0.74 | 0.04 | 58 − 41 = | | 17 | |
| 0.75 | 0.91 | 0.05 | 74 − 58 = | | 16 | |
| 0.92 | 1.08 | 0.06 | 91 − 74 = | | 17 | |
| 1.09 | 1.24 | 0.07 | 108 − 91 = | | 17 | |
| | | | 124 − 108 = | | 16 | |
| 1.25 | 1.41 | 0.08 | 141 − 124 = | | 17 | CYCLIC |
| 1.42 | 1.58 | 0.09 | 158 − 141 = | | 17 | |
| 1.59 | 1.74 | 0.10 | 174 − 158 = | | 16 | |
| 1.75 | 1.91 | 0.11 | 191 − 174 = | | 17 | |
| 1.92 | 2.08 | 0.12 | 208 − 191 = | | 17 | |
| 2.09 | 2.24 | 0.13 | 224 − 208 = | | 16 | |

FIG.21

SALES DATA PROCESSING SYSTEM CAPABLE OF AUTOMATICALLY CALCULATING SALES TAXES

BACKGROUND OF THE INVENTION

1. Field of the Invention

The present invention generally relates to a sales data processing method and a sales data processing system, suitable for an electronic cash register and a POS (Point-of-Sales) system. More specifically, the present invention is directed to a sales data processing method and a sales data processing system, capable of automatically calculating sales taxes with respect to sales amounts of taxable merchandise by referring to a tax table.

2. Description of the Related Art

Nowadays, the U.S. tax system is a rather complicated system. Therefore, very heavy workloads for executing tax processes are given to relatively small retail shops. For instance, state sales tax normally belongs to direct tax paid by buyers. This state sales tax is paid as state tax in response to sales amounts in retail shops. In a general retail shop, tax amounts listed in a tax amount table (tax chart) published by each state are manually set into a tax table stored in an electronic cash register in combination with sales amount ranges. This electronic cash register is installed in this retail shop in order to calculate this state sales tax. Then, tax amounts depending on sales amounts are calculated with reference to this tax amount table set in the electronic cash register.

However, this registering/setting work is very heavy, because the tax chart is voluminous, as indicated in FIG. 21, and because the tax amounts are subdivided in accordance with the respective sales ranges. Under these circumstances, all pages of the tax chart are not manually set/registered into the tax table. Instead the setting/registering work is performed by utilizing the regularity of each price range corresponding to the sales tax.

Concretely speaking, an operator first calculates difference values one by one in a manual manner with reference to the tax chart shown in FIG. 21 (also see COLORADO SALES TAX CHART). One difference value is calculated by subtracting one preceding "TO"-value (namely, a high end maximum break point) from one "TO"-value of each of the price ranges, corresponding to a tax amount. Then, the operator writes these manually calculated difference values on paper. Thereafter, the operator discriminates the non-cyclic patterns (e.g., "10" and "14" in FIG. 21) having regularity from the cyclic patterns (e.g., "17, 17, 16, 17, 17, 16" in FIG. 21) in the difference value series of the "TO" values. Finally, the operator manipulates the key input device to enter the difference values of the non-cyclic patterns and the difference values of one pattern series into the tax table of the electronic cash register.

As previously described, when the tax table is set, the above-explained various manual operators carried out by the operator may contain many careless mistakes and these operators are also cumbersome to perform. Moreover, since this sort of tax chart is frequently changed, the tax table setting operators must be frequently carried out, which may forcibly require very heavy workloads to the operator.

SUMMARY OF THE INVENTION

The present invention has been made to solve the above-described problems, and therefore, has an object to provide a sales data processing system capable of automatically calculating tax amounts with respect to sales amounts of merchandise and capable of automatically setting the calculated tax amounts to tax tables by merely inputting sales tax amounts listed in a tax chart in which the respective sales tax amounts are indicated in correspondence with price ranges of taxable subjects.

Another object of the present invention is to provide a sales data processing system capable of automatically calculating a difference value of "TO"-values corresponding to each of price ranges of taxable subjects by merely inputting the tax amounts listed in the tax chart, and also capable of setting a cyclic pattern series extracted from the difference value series into a tax table.

A further object of the present invention is to provide a sales data processing system capable of calculating the respective tax amounts and the taxable subject price ranges thereof from the difference values of "T0"-values automatically set in the tax table, and also capable of issuing a checking report printed in a similar printing format to that of the tax chart.

To achieve these objects, a sales data processing system according to the present invention comprises:

input means for entering into a tax amount list an upper limit value, a lower limit value, and a tax amount, said upper limit value and said lower limit value defining a predetermined range of sales amounts, and said tax amount being determined based on a sales amount defined within said predetermined range;

difference value calculating means for calculating difference values between a presently entered one of the upper and lower limit values and a previously entered one of the upper and lower limit values;

difference value storage means for storing said difference values calculated by said difference value calculating means in accordance with a calculation order;

difference value series pattern judging means for judging a first difference value series not having regularity and a second difference value series having regularity repeated in a predetermined pattern from a series of said difference values stored in said difference value storing means; and tax amount information table forming means for forming a tax amount information table having a tax amount information pattern in which said first difference value series not having regularity is used as a non-cyclic portion and a first cycle of said second difference value series having regularity is used as a cyclic portion.

Accordingly, in the sales data processing system, when the upper limit values and the lower limit values are sequentially inputted which can specify the price ranges of the taxable subjects and the tax amounts thereof as listed in the tax chart, the difference values of the upper limit values with respect to the respective price ranges can be automatically calculated and also can be automatically set to the tax table. Even when the content of the tax chart is frequently changed, the tax amount setting operations can be correctly and easily performed. Thus, the workload given to the operator can be greatly reduced.

BRIEF DESCRIPTION OF THE DRAWINGS

A more complete understanding of the teachings of the present invention may be acquired by referring to the accompanying figures, in which like reference numbers indicate like features and wherein:

FIG. 2 illustrates a content of a PLU memory 2-2 employed in the electronic cash register of FIG. 1;

FIG. 3 illustrates a content of a tax table memory 2-4 employed in the electronic cash register of FIG. 1;

FIG. 4 shows a concrete content example of the tax table, and difference values related to entered tax amounts;

FIG. 11 represents a printed content of an input setting receipt issued when the tax table is entered;

FIG. 13 represents a printed content of the issued setting check report;

FIG. 18A to FIG. 18C schematically indicate different formats of tax tables formed in an electronic cash register according to a third embodiment of the present invention;

FIG. 20A to FIG. 20D are explanatory diagrams for explaining various tax data input operations and difference values calculating operations executed in an electronic cash register according to a third embodiment of the present invention; and FIG. 21 indicates the tax table used to explain operations of the conventional electronic cash register.

DETAILED DESCRIPTION OF THE PREFERRED EMBODIMENTS

Referring now to FIG. 1 to FIG. 15, an electronic cash register functioning as a sales data processing system, according to a first preferred embodiment of the present invention, will be described in detail.

OVERALL ARRANGEMENT OF FIRST ELECTRONIC CASH REGISTER

Figure 1:
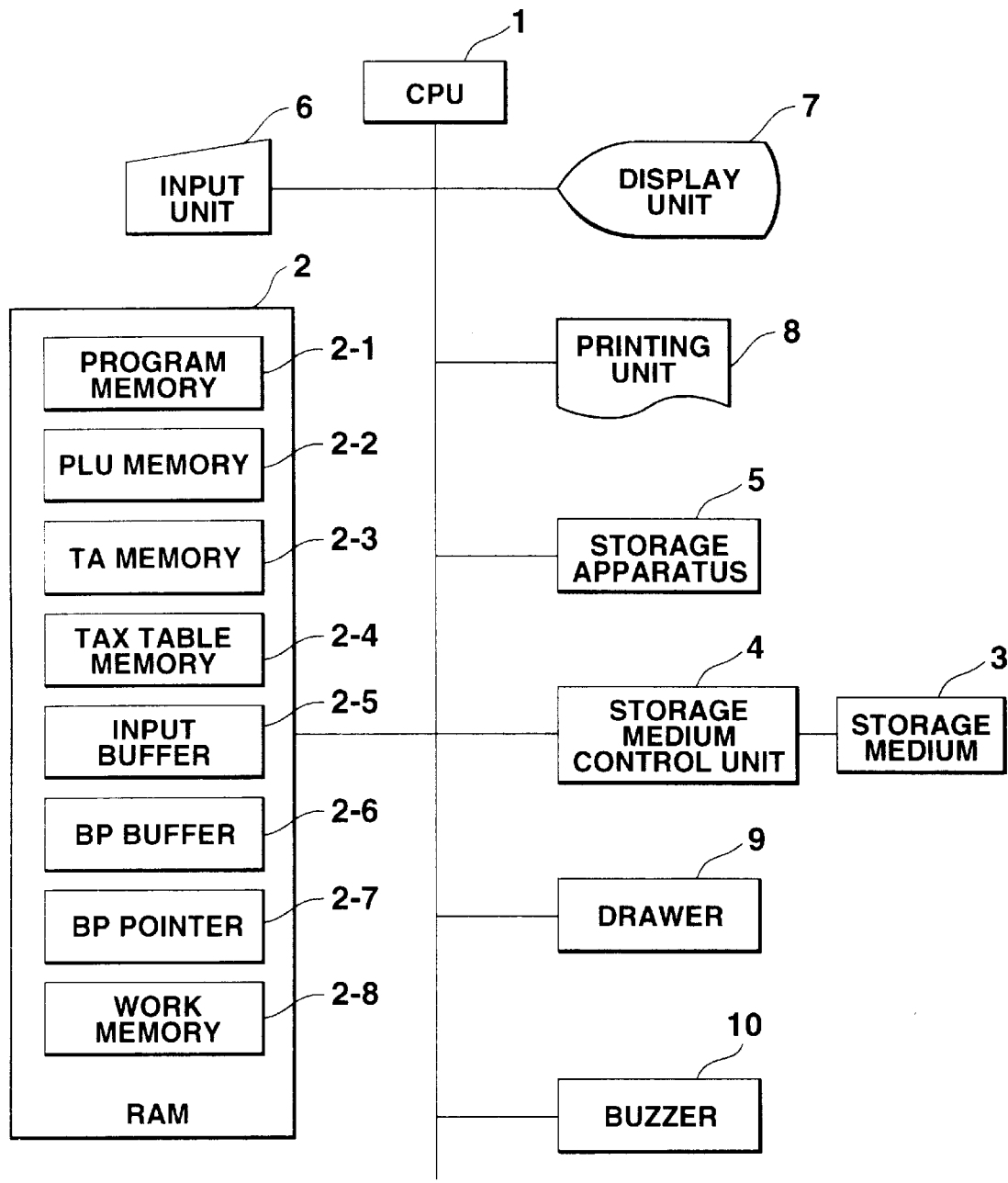
FIG. 1 is a schematic block diagram for representing an overall arrangement of an electronic cash register according to a first embodiment of the present invention.

FIG. 1 is a schematic block diagram for showing an overall arrangement of an electronic cash register according to the first preferred embodiment of the present invention.

A CPU1 is a central processing unit for controlling overall operations of this first electronic cash register in accordance with a program stored in a program memory 2-1 of a RAM (random access memory) 2. A portable type storage medium 3 is constructed of a magnetic, or optical storage medium, or a semiconductor memory such as a floppy disk, an optical disk, and a RAM card, which are detachably mountable on this electronic cash register. Programs and/or data are stored into this portable type storage medium 3. Under such a condition that this portable type storage medium 3 is mounted on the main body of this electronic cash register, the programs and the data saved in the portable type storage medium 3 are acquired via a storage medium control unit 4 by the CPU1 to be stored into a storage apparatus 5. The storage apparatus 5 is constituted by a ROM, a hard disk, an optical disk and so on. This storage apparatus 5 stores an operating system (OS), various sorts of application programs, or character font data. When programs and data are transmitted from other appliances via a communication line, the CPU1 acquires these programs and data so as to store them into the storage apparatus 5.

An input unit 6 is a key input apparatus equipped with various normal keys such as a ten key (numeral entry key), a department key, and a total key. Data about merchandise/sales sort entered from the input unit 6 when a sort of merchandise is registered is acquired by the CPU1 and displayed on a display unit 7. Also, the merchandise/sales sort data is supplied to a printing unit 8 to be printed out on a receipt/journal, and is registered into the PLU memory 2-2 provided in the RAM 2. In this embodiment, as shown in FIG. 2, the PLU memory 2-2 is arranged in such a manner that a PLU code, a merchandise name, a unit price, a tax table flag, and a sales quantity with respect to each of merchandise are stored. The tax table flag is used to indicate as to whether or not merchandise corresponds to taxable merchandise. When the tax table flag becomes "1", this flag indicates "taxable" merchandise. If the merchandise corresponds to the taxable merchandise, then the CPU1 adds a sales amount to a TA memory 2-3 in the RAM 2. This TA memory 2-3 is employed so as to store therein a total amount of taxes with respect to a single transaction. Further, when the total key for totaling a sales amount of a single transaction is manipulated, the CPU1 causes a cash drawer 9 to be opened, and calculates a sales tax with respect to a total amount of taxable merchandise saved in the TA memory 2-3 with reference to a tax table memory 2-4 in the RAM 2.

CONTENT OF TAX TABLE MEMORY

The tax table memory 2-4 is arranged, as shown in FIG. 3, to store therein a header portion, a non-cyclic number, and various difference values. To the header portion, various sorts of control codes are set. The non-cyclic number indicates a data number of a non-cyclic pattern (will be explained in detail). These difference values are provided for a non-cyclic pattern and one circle of cyclic patterns (will be discussed in detail). That is, the non-cyclic number indicates the data quantity used to discriminate the cyclic pattern from the non-cyclic patterns. Among the difference values set in the tax table memory 2-4, a portion corresponding to the non-cyclic quantity counted from the head difference value will constitute a non-cyclic pattern. The difference values subsequent to this non-cyclic pattern are discriminatable as a cyclic pattern. In FIG. 3 values corresponding to BP0 and BP1 represent the difference values of the non-cyclic pattern, and values corresponding to BP2, BP3, - - - BP7, subsequent to BP1, indicate the difference values of the cyclic pattern. The contents set to this tax table memory 2-4 are automatically set by entering a content described in a tax table (tax amount list) shown in FIG. 4. That is, when an operator instructs to execute a tax table input setting process operation and thereafter, sequentially enters the content described in the tax table from the head content, the CPU1 checks as to whether or not the entered data is correct. If the correct data is entered, then this correct data is set to an input buffer 2-5, and a difference value is calculated based on the content of this input buffer 2-5.

It should be noted that the tax table (tax amount list) of FIG. 4 indicates that the tax amount is increased in proportional to each 1 cent of U.S. currency. In this case, the tax is not directly related to the calculation of the difference value, but related to such a value in the case that it is not proportionally increased. However, it should be understood that when the operator has obligations to judge as to whether or not the tax amount is proportionally increased while confirming this tax table, very heavy workloads would be given to this operator, and the tax amount entry mistakes would occur. To avoid such a problem, in accordance with the present invention, the operator enters the tax amounts irrelevant to such a fact as to whether or not these tax amounts are proportionally increased.

PICTORIAL CALCULATING PROCESS OF DIFFERENCE VALUES

Figure 5:
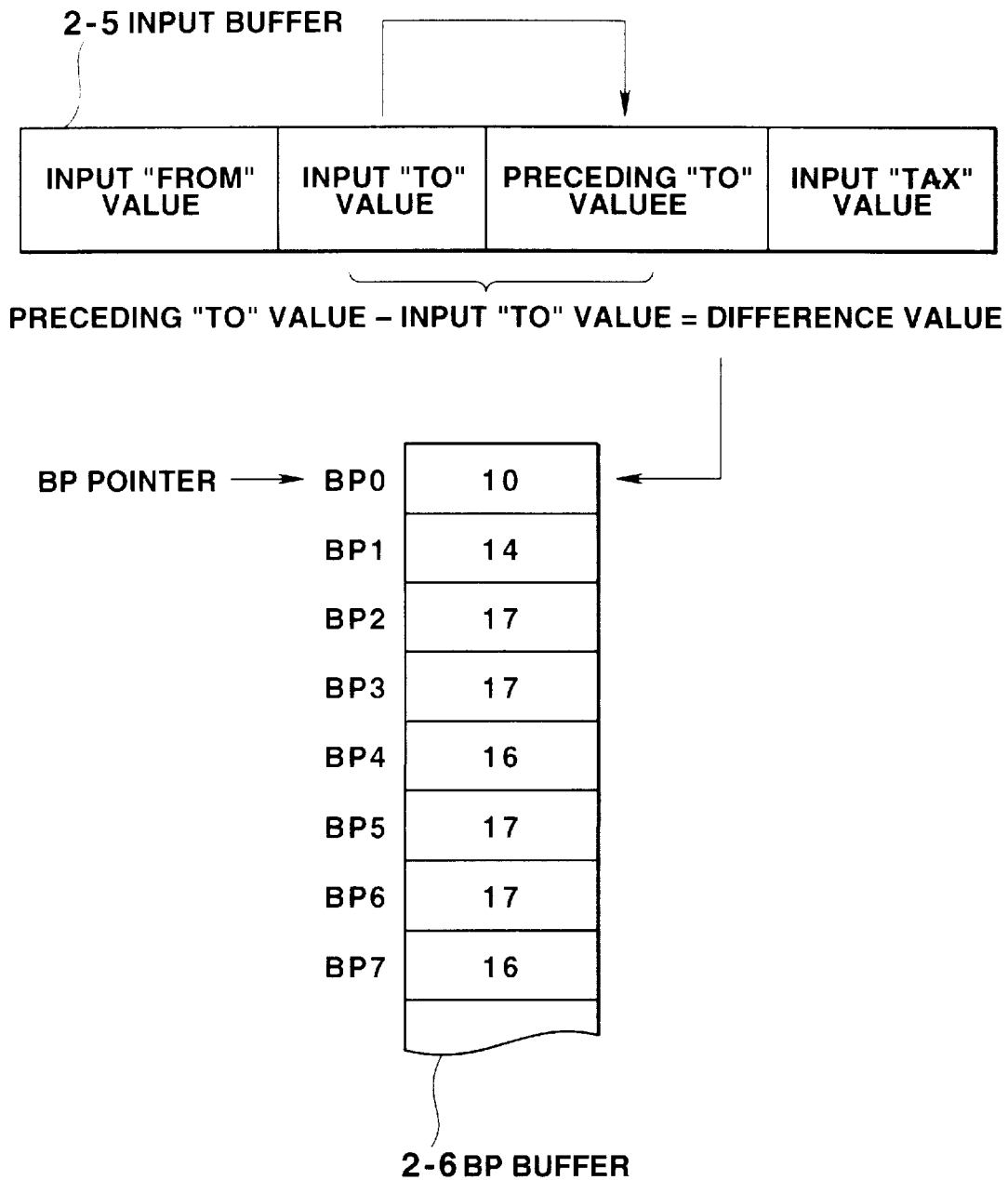
FIG. 5 illustratively shows a content of an input buffer 2-5 and a content of a BP buffer 2-6, employed in the electronic cash register of FIG. 1.

FIG. 5 pictorially shows a calculating process step of difference values. In this case, when the contents described in the tax table are sequentially and directly inputted, the data are entered in this order of a low and maximum break point "FROM"-value, a high and maximum break point "TO"-value, and a tax amount "TAX"-value for every price range. A key operation sequence is defined from "FROM"-value via <department 1>, "TO"-value, <department 2>, and "TAX"-value to <department 3>. Symbols <department 1> to <department 3> indicate a sort of input data, and many function as a key for instructing an entry definition. The input buffer 2-5 is so arranged as to store the presently inputted "FROM"-value (input "FROM" value), the presently inputted "TO"-value (input "TO" value), the previously inputted "TO"-value (preceding "TO" value), and the presently inputted "TAX"-value (input "TAX" value). The CPU1 subtracts the input "TO" value from the preceding "TO" value stored in the input buffer 2-5 to obtain a "difference value." In other words, every time the "FROM"-value, the "TO"-value, and the "TAX"-value of the respective price range of the taxable subject are inputted, the difference value corresponding to this price range is calculated and then is set to the BP buffer 2-6 under control of the CPU1. A write position/a read position of this BP buffer 2-6 are designated by the value of the BP pointer 2-7. The difference values which have been sequentially calculated in correspondence with the respective price ranges of the taxable subject are sequentially stored into the BP buffer 2-6.

Based on the difference values stored in this BP buffer 2-6, the CPU1 judges as to whether or not such a difference value series having regularity in a series of these difference values. The CPU1 further recognizes such a difference value series having the regularity as the cyclic pattern, and also such a difference value series having no regularity as the non-cyclic pattern. At this time, the CPU1 calculates the number (quantity) of these non-cyclic patterns, and sets this calculated number into the tax table memory 2-4 in combination with the difference value series of the non-cyclic pattern and the difference value series of the cyclic pattern. In the case that the CPU1 can recognize the non-cyclic pattern and the cyclic pattern under normal condition, this CPU1 drives a buzzer 10 to be turned ON. Conversely, when the CPU1 cannot recognize the non-cyclic pattern and the cyclic pattern under normal condition, the CPU1 also drives the buzzer 10 under a different frequency from that of the above normal condition. In other words, the buzzer 10 can discriminatably notify whether or not the recognition about the non-cyclic pattern and the cyclic pattern can be carried out. As a consequence, the operator can recognize that the subsequent input operation is no longer required. In this case, the CPU1 may accept the entry of data corresponding to approximately 2 cycles of cyclic patterns while the cyclic pattern is recognized under normal condition. To the contrary, when the cyclic pattern could not be recognized under normal condition, the CPU1 prohibits the further data entry.

CONTENT OF WORK MEMORY

Figure 6:
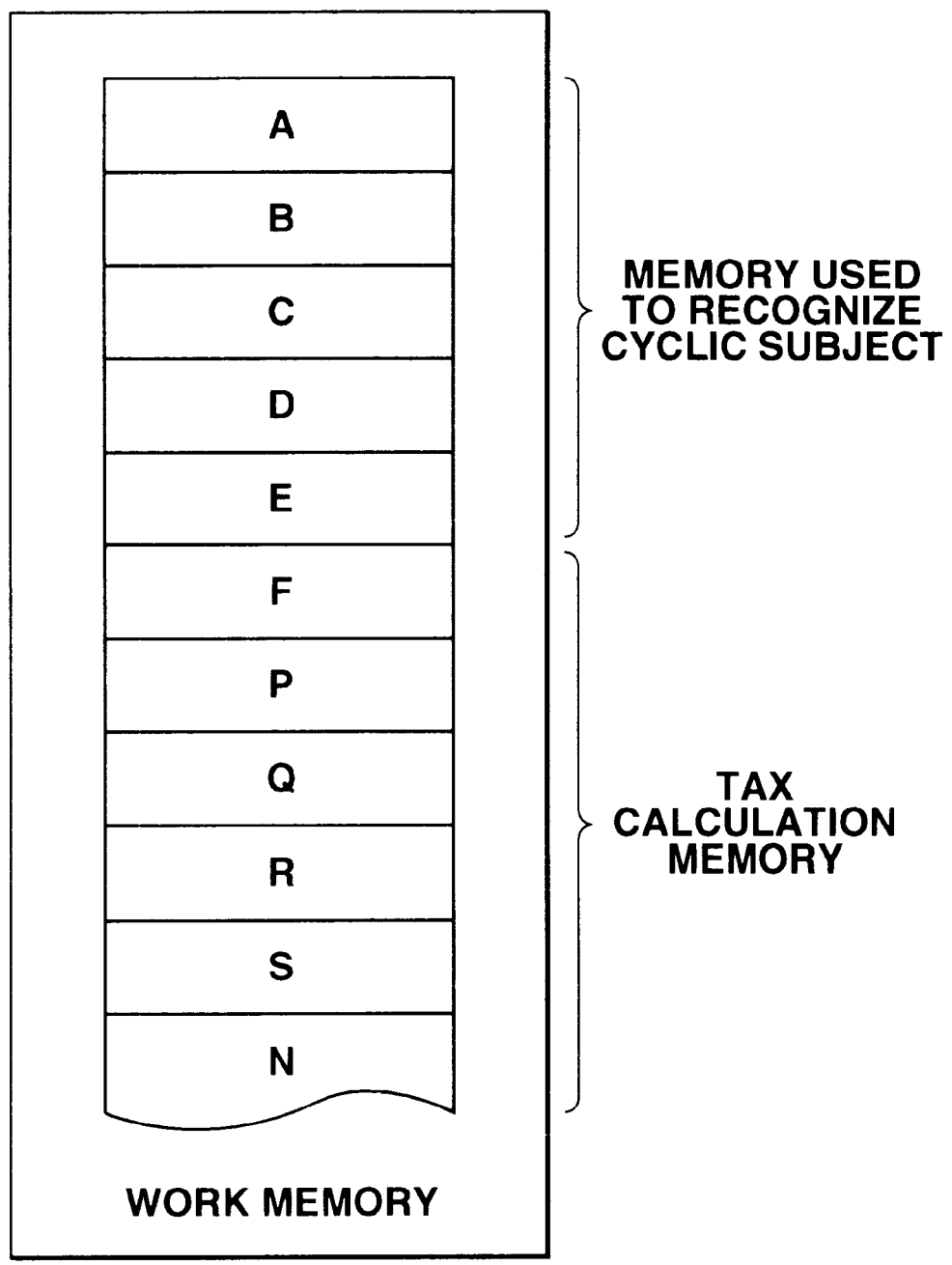
FIG. 6 illustrates a content of a work memory 2-8 employed in the electronic cash register of FIG. 1.

As shown in FIG. 6, the work memory 2-8 is arranged by containing "A" to "F" pointers, and "P" to "S" registers. The A pointer to the F pointer are memories used to recognize cyclic patterns. The P register to the S register are registers used to calculate tax amounts for sales amounts of taxable goods with reference to the content of the tax table memory 2-4.

The printing unit 8 is a double printing type printer capable of printing a receipt/a journal. When an instruction is issued to print out the tax table (tax amount list) in order to check the set content of the tax table memory 2-4, the CPU1 instructs the printer unit 8 to print out the respective "FROM"-value, "TO"value, and "TAX"-value as the tax table (setting check report). These values are calculated from the respective difference values stored in the tax table memory 2-4 every the price range of the taxable subject.

OVERALL OPERATION OF ELECTRONIC CASH REGISTER

Next, overall operation of the electronic cash register according to the first embodiment of the present invention will now be described with reference to flow charts indicated in FIGS. 7, 8, 11, 13, 15, and 16. It should also be noted that the program used to realize the respective functions described in these flow charts is stored in the portable storage medium 3 and the storage apparatus 5 in the program code format readable by the CPU1, and the content thereof is loaded on the program memory 2-1.

DATA INPUT/SETTING PROCESS OF TAX TABLE

First, a description will now be made of such operations when data is inputted/set into the tax table memory 2-4. Now, when an execution of this data input/setting operation is instructed from the input unit 6, the CPU1 executes operations in accordance with the flow chart shown in FIG. 7.

Figure 7:
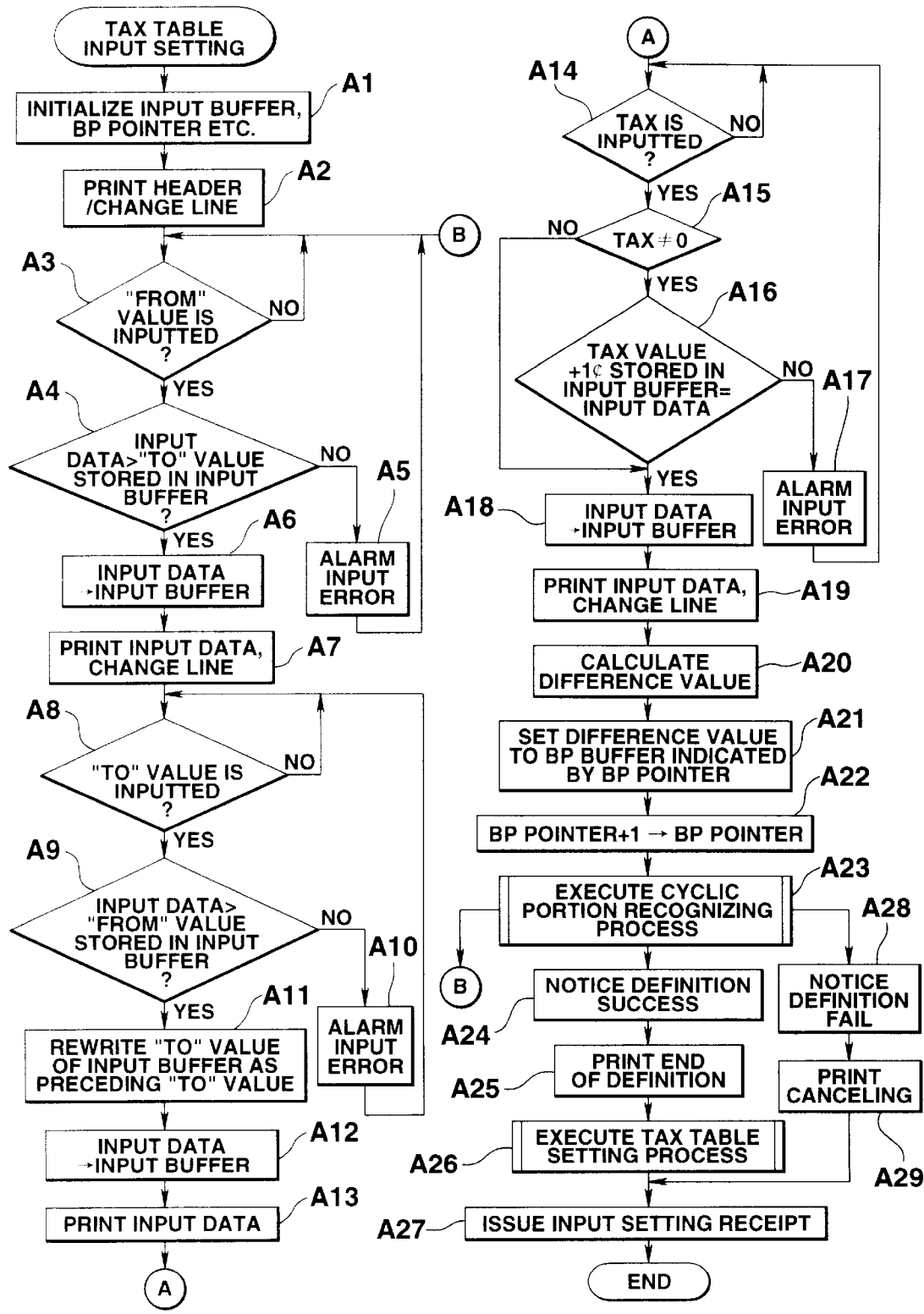
FIG. 7 is a flow chart for describing overall operation of the first electronic cash register during the tax table input setting operation.

The tax table input/setting process operation defined in FIG. 7 is exemplified by such a case that the tax table (tax amount list) shown in FIG. 4 is entered. In accordance with this tax table, the "FROM"-value and the "TO"-value are inputted as the data indicative of the price range of the taxable subject, and the tax amount ("TAX" value) which is proportionally increased from 0 $00 cent to 1 cent is inputted.

First, an initializing process is executed to initialize the contents of the input buffer 2-5, the BP buffer 2-6, and the BP pointer 2-7 by the CPU1 (step Al). Also, the printing unit 8 is driven to print out the header information on a head portion of a receipt (step A2). In this case, this receipt is an input setting receipt shown in FIG. 11, on which the data entered when the tax table is set are sequentially printed out. The present day/date are printed on this header portion of this input setting receipt.

Then, under input waiting condition of the "FROM"-value (step A3), if the "FROM"-value is inputted, then the input checking operation is carried out (step A4). As a result, when the entered "FROM"-value is such a data value larger than the input "TO" value saved in the inputted buffer 2-5, the CPU1 judges that the entered "FROM" value corresponds to the input correct data, and then the input data is set as an input "FROM" value to the input buffer 2-5 (step A6), and further this input "FROM" value is printed on the input setting receipt, and this input setting receipt is line-fed by 1 line (step A7). It should be noted that when the firstly inputted "FROM" value is equal to "0.00", this "FROM" value is handled as the correct data. Conversely, when the entered "FROM"-value is such a data smaller than the input "TO" value, the CPU1 notifies "input error" (step A5), and then the system operation is brought into the input waiting condition of the "FROM"-value (step A3). Next, under input waiting state of the "TO"-value (step A8), when the "TO"-value is inputted, an input check is carried out (step A9). That is, a check is made as to whether or not the inputted data is larger than the input "FROM" value saved in the input buffer 2-5. If the inputted data is smaller than, or equal to the input "FROM"-value, then the CPU1 notifies an input error (step A10), and the system operation is brought into the input waiting condition of the "TO"-value (step A8). To the contrary when the inputted data corresponds to correct data, after the input "TO" value stored in the input buffer 2-5 is again set to the preceding "TO" value region (step A11), inputted data is set as the input "TO" value to the input buffer 2-5 (step A12), and also the input "TO" value is printed out on the input setting receipt (step A13).

Next, under input waiting condition of the "TAX" value (step A14), when the "TAX" value is inputted, if this "TAX" value is not equal to "0" (step A15), then an input check is carried out (step A16). In this check, when such a value obtained by adding "1 cent" to the "TAX" value saved in the input buffer 2-5 is not made coincident with the inputted data, the CPU1 notifies the input error (step A17), and then the system operation is brought into an input waiting condition of the "TAX" value (step A14). Conversely, when this added value is made coincident with the inputted data, this inputted data is set as an input "TAX" value into the input buffer 2-5 (step A18), and then this input "TAX" value is printed on the input setting receipt, and this input setting receipt is line-fed by 1 line (step A19). It should be understood that when the "TAX"-value is equal to "0" (step A15), this "TAX"-value is handled as correct data.

When the "FROM"-value, the "TO"-value, and the "TAX"-value of the head entry are sequentially inputted in the above-described manner in accordance with the content described in the tax table, a difference value calculating process operation is carried out (step A20). In other words, a calculation is made of such a difference value by subtracting the input "TO" value from the preceding "TO" value stored in the input buffer 2-5 shown in FIG. 5. Then, this difference value is set to a BP buffer 2-6 indicated by a BP pointer 2-7 (step A21). Assuming now that the "FROM"-value (0.00), the "TO"-value (0.10), and the "TAX"-value (0.01) of the head entry in the tax table shown in FIG. 4 are inputted, a calculation is made of "10−0=10" as the difference value. This value is set to the head position of the BP buffer 2-6. Then, the process operation is advanced to a step A22 at which "1" is added to the content of the BP pointer 2-7 so as to update this content value, and then is advanced to a cyclic pattern recognizing process operation (step A23).

CYCLIC PATTERN RECOGNIZING PROCESS

Figure 8:
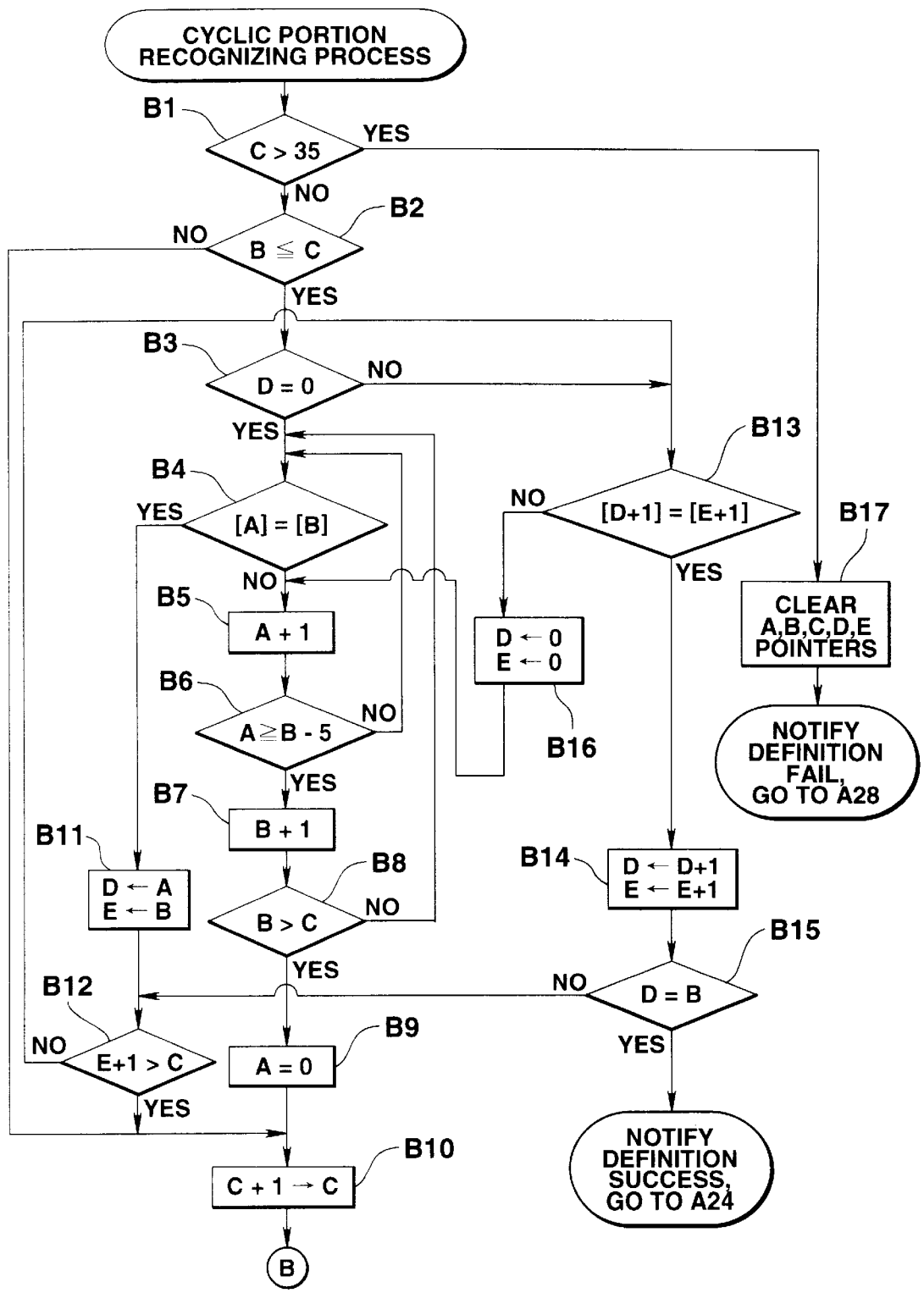
FIG. 8 is a flow chart for describing a cyclic pattern recognizing process defined at a step A3 of FIG. 7.

FIG. 8 is a flow chart for representing this cyclic pattern recognizing process. Now, operation of the cyclic pattern recognizing process will be simply explained.

That is, when the CPU1 judges as to whether or not the difference value series having the regularity is contained in the difference values sequentially stored in the BP buffer 2-6, the CPU1 determines the difference value positioned at the head position thereof as first data. Also, the CPU1 determines such a difference value stored at a position apart from this first data by a preselected number (in this case, 6) as second data, and further determines the difference value series which have been stored from the position of the first data up to a position near the second data as a cyclic pattern judging subject. As a result of comparisons between the first data and the second data, when the CPU1 detects "incoincident" the CPU1 repeatedly performs the comparing operation between the first data and the second data while updating an address (first address) for designating the first data position under such a condition that the first data position is separated from the second data position more than 6. When the number of data positions between the first data position and the second data position reaches a preselected number, namely 6 during this comparing operation, the CPU1 performs the comparing operation while updating an address for designating the second data position (namely, second address). On the other hand, in such a case that the CPU1 detects such a fact that the first data is made coincident with the second data, the CPU1 stores/saves the first address and the second address when these first and second data are firstly made coincident with each other. Thereafter, the CPU1 repeatedly performs the comparing operation between the first data and the second data while updating the first address and the second address under such a condition that the first data position is separated from the second data position more than 6. As a result, when the CPU1 detects such a fact that the first data is continuously made coincident with the second data while the first address reaches the saved second address, the CPU1 may recognize as the cyclic patterns the respective difference value series existing between the saved first address and the address smaller than the second address, and also may recognize other difference value series as non-cyclic patterns.

In this case, both the A pointer and the D pointer of the work memory 2-8 are address pointers for producing a first address used to designate the first data position of the BP buffer 2-6. Also, both the B pointer and the E pointer are address pointers for producing a second address used to designate the second data position of the BP buffer 2-6, and to designate a read position of the BP buffer 2-6. The C pointer is an input pointer, the content of which is incremented by +1 every time a combination of the "FROM"-value, the "TO"value, and the "TAX"-value (will be referred to as a "table parameter" hereinafter) is entered in correspondence with each of the price ranges of the tax table. Then, "0" is set as an initial value to each of the A, C, D and E pointers, whereas "6" is set as an initial value to the B pointer. It should be noted that this initial value of this B pointer represents a preselected quantity derived from a head table parameter of the tax table, and also constitutes such a value capable of effectively recognizing a cyclic pattern, which is obtainable from experiences.

First, a table parameter located at the head position of the tax table is inputted. In this case, the above-described initial values have been set to the A pointer to the E pointer. Under this condition, a check is made as to whether or not the value of the C pointer exceeds "35" at a step B1 of the flow chart shown in FIG. 8. This numeral value of "35" is set by the following reason. That is, even if 35 pieces of table parameters are entered, when the CPU1 could not recognize the cyclic pattern, the CPU1 prohibits the entry of the subsequent table parameter. This numeral value of "35" is obtainable from experiences. Since the initial value of "0" is set to the C pointer, the process operation is advanced to a step B2. At this step B2, a check is done as to whether or not the value of C pointer is larger than the value of B pointer. Since the initial value of "6" is set to the C pointer, the process operation is advanced to the step B10. At this step B10, "1" is added to the content of this C pointer so as to update this value. Thereafter, the process operation is returned to the step A3 of FIG. 7, at which the system operation is brought to an input waiting condition of the "FROM" value with respect to the next price range. The above-described operations defined at the steps A3 to A21 and the steps B1, B3, B10 are repeatedly performed until the value of the C pointer becomes "6" in the cyclic pattern recognizing process operation. As a result, based upon the table parameters entered in accordance with the respective price ranges from the head item of the tax table up to the 6th item, the CPU1 calculates "10, 14, 17, 17, 16, 17" as the difference values, and then sequentially sets these difference values to the BP buffer 2-6.

Figure 9:
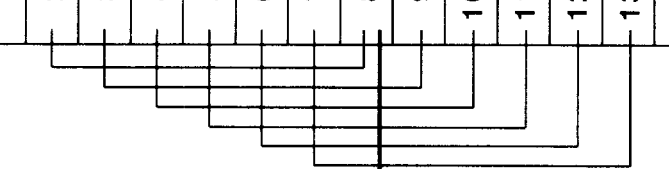
FIG. 9 is an explanatory diagram for explaining concrete contents of operation for recognizing the cyclic patterns by analyzing the content of the BP buffer 2-6.

FIG. 9 is an explanatory diagram for concretely explaining the operation of the cyclic pattern recognizing process. That is, FIG. 9 represents a correspondence relationship between the content of the BP buffer 2-6 and the contents of the address pointers "A" to "E", and shows how to change the values of the respective address pointers "A" to "E" by executing the cyclic pattern recognizing process operation. In this case, as shown in FIG. 9, the value of the C pointer is updated as "0" to "5", whereas the value of the A pointer, the B pointer, the D pointer, and the E pointer are still the initial values thereof. As a consequence, the execution of the cyclic pattern recognizing process operation is, in fact, reserved until more than 6 table parameters are inputted.

Now, when a seventh table parameter is inputted, "17" is obtained as the difference value. Then, the process operation is advanced to the cyclic pattern recognizing process operation shown in FIG. 8. In this case, the values of the C pointer and B pointer are C=6 and B=6. Since both the pointer values are made coincident with each other, the process operation is advanced to a step B3. At this step, a check is done as to whether or not the value of the D pointer is equal to "0". In the case that the CPU1 detects such a fact that the above-explained first data is made coincident with the second data, the value of the A pointer is set as the first address to the D pointer. Now, since the value of the D pointer remains as the initial value of "0", the process operation is advanced to a step B4. At this step B4, the CPU1 checks as to whether or not a difference value (will be referred to as "data [A]" hereinafter) saved in the BP buffer 2-6, which is addressed by the value of the A pointer, is made coincident with another difference value (will be referred to as "data [B]" hereinafter) saved in the BP buffer 2-6, which is addressed by the value of the B pointer. In this case, since the data [A] and the data [B] saved in the BP buffer 2-6 are "10" and "17" respectively, which are addressed by the value "0" of the A pointer and the value "6" of the B pointer, incoincidence between these data [A] and [B] is detected. When such an incoincidence is detected, the value of the A pointer is incremented by "1" (step B5), and the comparing operation (step B4) between the data [A] and the data [B] is repeatedly performed under predetermined condition (step B6). That is, a check is made as to whether or not the value of the A pointer is larger than, or equal to such a value obtained by subtracting "5" from the value of the B pointer (step B6). If the value of the A pointer is smaller than the value obtained by subtracting "5" from the value of the B pointer (namely, data [A] is separated from data [B] more than 6), then the comparing operation is repeated while updating the value of the A pointer. In this case, since the value of the A pointer indicates "1" and the value of the B pointer indicates "6", this condition can be established. After this condition can be established, the value of the B pointer is incremented by 1 (step B7). As a result, the comparing operation between the data [A] and the data [B] is repeatedly performed (steps B4 to B7) under such a condition that the value of the B pointer is smaller than, or equal to the value of the C pointer (step B8). In other words, this comparing operation is repeated if the value of the C pointer is equal to the entered number of the table parameter, and also the value of the B pointer is smaller than this parameter entered number. In this case, since the value of the B pointer is equal to "7" and the value of the C pointer is equal to "6", no further comparing operation is performed, and the A pointer is cleared (step B9). Also, the value of the C pointer is updated by "+1" (step B10), and thereafter the process operation is returned to the previous step A3 of the flow chart shown in FIG. 7.

Then, after an 8th table parameter has been inputted and a difference value thereof had been calculated (step A20), the cyclic pattern recognizing process operation defined in the flow chart of FIG. 8 is again executed. In this case, since the respective pointer values are given as A=0 and B=7, and further the data [A] indicates "10" and the data [B] denotes "16", a detection is made of "incoincident" between them (step B4). Accordingly, the value of the A pointer is updated to thereby become "1" (step B5). Since the data [A] is separated from the data [B] more than 6 (step B6), this data [A] is compared with the data [B] (step B4). In this case, the data [A] is equal to "14" and the data [B] is equal to "16", so that the incoincidence between the difference values is detected. Therefore, the value of the A pointer is further updated to become "2". Then, "A=B−5" is detected at a step B6. As a result, the value of the B pointer is updated to become "8" (step B7). As a consequence, such a condition "B>C" can be satisfied (step B8). Subsequently, the process operations defined at steps B9 and B10 are executed, and thereafter the process operation is returned to the previous step A3 of the flow chart shown in FIG. 7.

Next, after a 9th table parameter is inputted and a difference value is calculated at a step A20, the process operation is advanced to the cycling pattern recognizing process operation shown in FIG. 8. That is, the values of the pointers are given as A=0, B=8, C=8, and the data [A] is equal to "10" and the data [B] is equal to "17", so that the CPU1 detects such a fact that the data [A] is not made coincident with the data [B] at the step B4. Under such a condition that the data [A] is separated from the data [B] more than 6, the comparing operation is repeatedly executed while updating the value of the A pointer (steps B4 to B6). In this case, the value of the A pointer is updated from "0" to "1" and "2" under such a condition that the value of the B pointer is fixed to "8". Now, when A=2, the data [A] becomes "17", and therefore is made coincident with the data [B]. As a result, the value of the A pointer is set to the D pointer, and the value of the B pointer is set to the E pointer (step B11). As described above, in the case that the CPU1 detects this coincidence between the data [A] and the data [B], addresses obtained when the data [A] is firstly made coincident with the data [B] are set to the D pointer and the E pointer respectively, corresponding to the A pointer and the B pointer. Subsequently, while the D pointer and the E pointer are updated, such a comparing operation for checking whether or not the data [A] is continuously made coincident with the data [B] is repeatedly performed under predetermined condition (step B12). In this case, a check is made at a step B12 as to whether not a condition of E+1>C can be satisfied. As a result, if the condition of E+1>C cannot be satisfied, then the process operation is advanced to a step B13. Conversely, since now C=8 and E=8, the condition of E−1>C can be satisfied. As a result, a further comparing operation is not performed, but the process operation is advanced to a step B10 at which the value of the C pointer is updated by +1.

Then, when the next 10th table parameter is entered, a similar process operation (as defined at step A3 to step A20) is executed, and thereafter, the process operation is entered to the flow operation of FIG. 8. In this case, the values of the respective pointers are given as C=9, A=2, B=8, D=2, and E=8. As a consequence, it is detected that D is not equal to 0 (step B3). In this case, while D=0, the data are under incoincident state, whereas when D is not equal to 0, such a condition is made by detecting that the difference value data are made coincident with each other. When a detection is made of such a fact that the pointer value D is not equal to 0, the process operation is advanced to a step B13. At this step B13, based upon such a value obtained by adding "1" to the content of the D pointer, a difference value (will be referred to as data [D+1] hereinafter) stored in the BP buffer 2-6 is compared with another difference value (will be referred to as a data [E+1] hereinafter) stored in the BP buffer 2-6. The data "D+1" is addressed by a value obtained by adding "1" to the content of the D pointer, and the data "E+1" is addressed by a value obtained by adding "1" to the content of the E pointer. In this case, since the pointer values represent D+1=3 and E+1=9, the data [D+1]32 17 and the data [E+1]=17. A detection is made such a fact that both the data are made coincident with each other. As a consequence, an increment process operation for adding "1" to each value of the D pointer and E pointer (step B14) is performed, and further the value of the D pointer is compared with the value of the B pointer (step B15). In other words, while updating the values of the D pointer and the E pointer, the data [D+1] is compared with the data [E+1]. Then, a check is made as to whether or not the data are continuously made coincident with each other until the value of the D pointer reaches such a value saved in the B pointer. Now, since D=3 and B=8, "incoincidence" is detected. Accordingly, since "E+1>C" is detected at the step B12, the process operation is advanced to a step B10, at which the value of the C pointer is updated.

Subsequently, every time the table parameter is inputted, a similar process operation as defined by the above-described steps B3, B13 to B15, B 12, and B10 is repeatedly performed in the cyclic pattern recognizing process operation. Then, when a detection is made of such a fact that the data are continuously made coincident with each other until the value of the D pointer becomes coincident with the value of the B pointer (step B15), the difference value series of "17, 17, 16, 17, 17, 16" existing between the A pointer and the B pointer may be recognized as cyclic patterns, and other difference value series, namely the difference value series of the head portion "10, 14" may be recognized as non-cyclic patterns.

When the cyclic patterns are recognized in this manner, the process operation is advanced to a step A24 of FIG. 7. At this step A24, the CPU1 drives the buzzer 10 so as to notify such a fact that the cyclic patterns could be correctly recognized, and further drives the printing unit 8 to print out "end of definition" on a receipt (step A25). After a tax table setting process operation is carried out in accordance with a flow chart shown in FIG. 10, an input setting receipt is issued. FIG. 11 represents a print sample of this input setting receipt. In this print sample, the entered "FROM"-value, "TO"-value, and "TAX"-value are sequentially printed out.

On the other hand, in such a case that even when the value of the C pointer exceeds "35", the CPU1 could not recognize the cyclic patterns (step B1), after each of the A pointer to the E pointer is cleared (step B17), the process operation is advanced to a step A28 of FIG. 7. At this step A28, the CPU1 drives the buzzer 10 to notify that the cyclic pattern could not be recognized. Then, after "cancel" is printed out (step A29), another input setting receipt is issued (step A27).

TAX TABLE SETTING PROCESS

Figure 10:
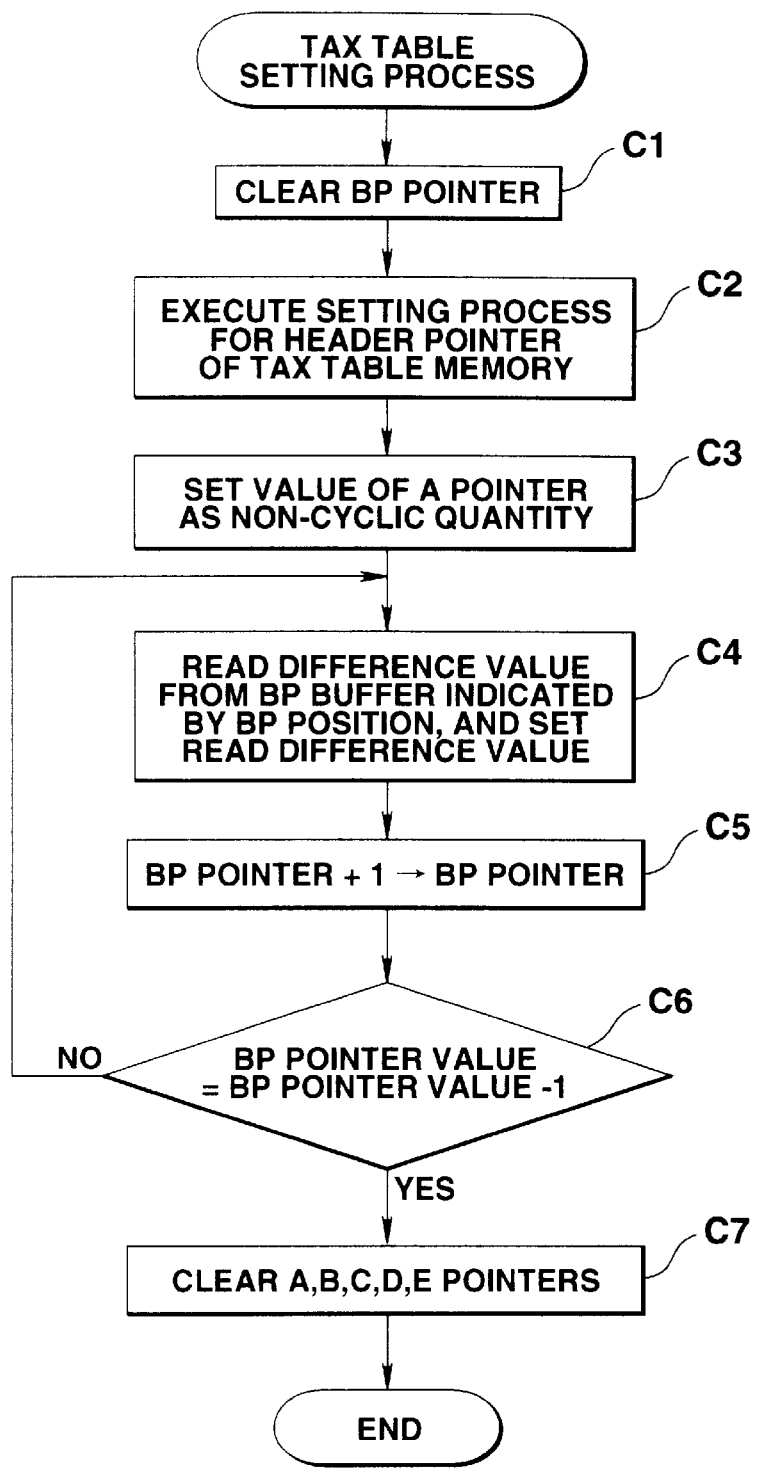
FIG. 10 is a flow chart for describing a tax table setting process operation defined at a step A26 of FIG. 7.

Referring now to a flow chart of FIG. 10, a tax table setting process operation will be explained.

First, at a step C1, the content of the BP pointer 2-7 is cleared. Next, a setting operation is performed with respect to the header portion of the tax table memory 2-4 (step C2). In this case, in order that the set content of the necessary item is left and the set contents of other items are invalidated, an invalidation code is written by designating the relevant item.

Next, a value of "2" of the A pointer is read, and this read value is set as the number of non-cyclic pattern into the tax table memory 2-4 (step C3). Then, a difference value pointed by a BP pointer 2-7 is read out from the BP buffer 2-6, and then this read difference value is set to the tax table memory 2-4 (step C4). As a consequence, a first difference value "10" of the non-cyclic pattern is set to the tax table memory 2-4. Thereafter, "1" is added to the content of the BP pointer 2-7 so as to update this pointer value (step C5). A check is made as to whether or not the value of the BP pointer 2-7 reaches such a value obtained by subtracting "1" from the content of the B pointer (step C6). Now, since the value of the BP pointer is equal to "1", this tax table setting process operation is returned to the step C4. Subsequently, a setting operation is repeatedly performed in such a manner that the difference values read from the BP buffer 2-6 while updating the value of the BP pointer 27 are sequentially set to the tax table memory 2-4. Then, when "BP=B−1" is detected at the step C6, all of the A pointer to the E pointer are cleared (step C7). As a consequence, the resultant content of the tax table memory 2-4 is obtained as indicated in FIG. 3, and the number of the non-cyclic pattern is set as "2"; the difference values of the non-cyclic patterns are set as "10", "14"; and the difference values of the cyclic patterns (1 circle values) are set as "17, 17, 16, 17, 17, 16" subsequent to the header portion.

SETTING/CHECKING REPORT ISSUING PROCESS

Figure 12:
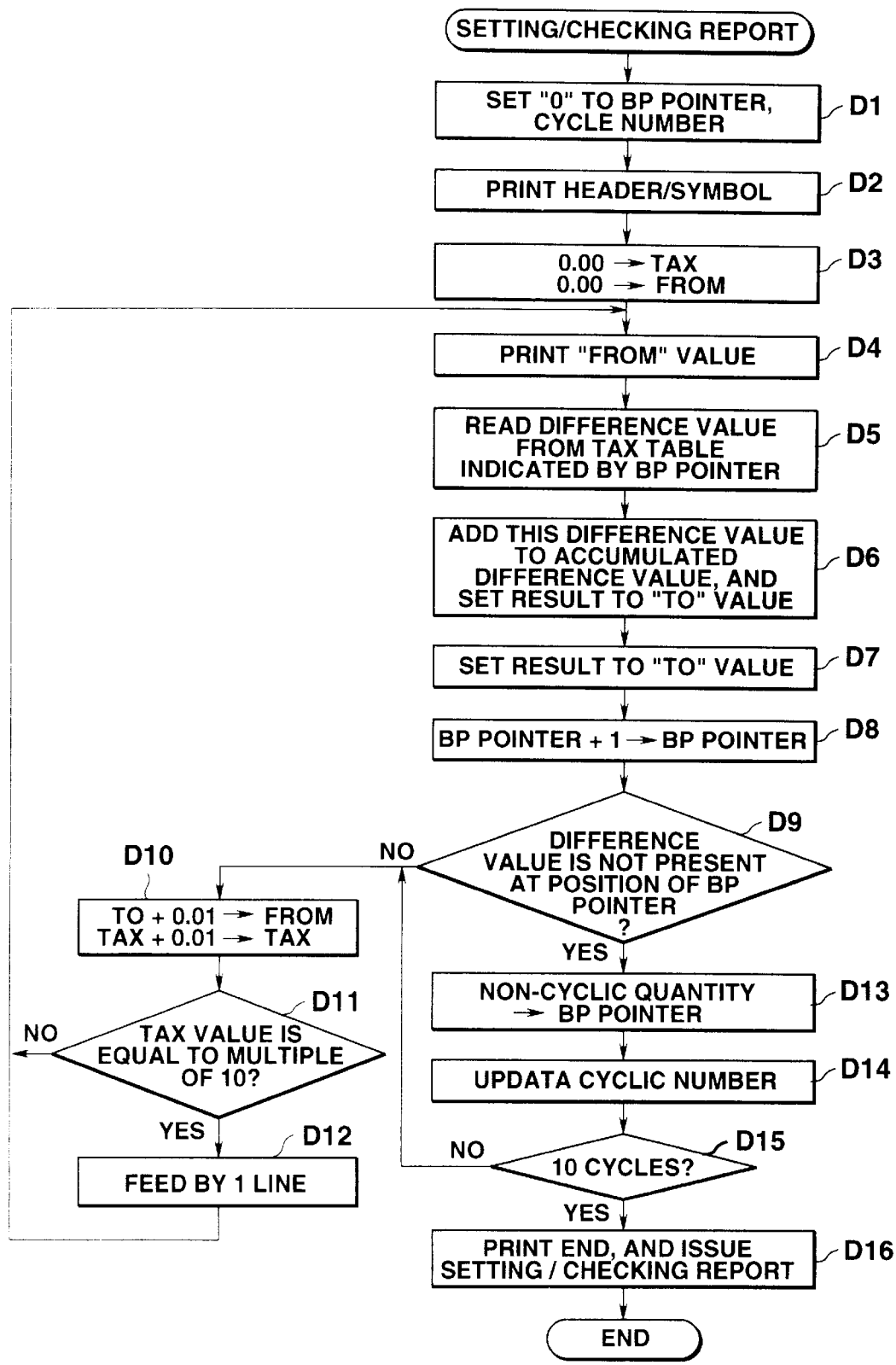
FIG. 12 is a flow chart for describing operations to issue a setting check report for checking the content set in the tax table memory 2-4.

In the case that the operator investigates as to whether or not the set contents of the tax table memory 2-4 are correct by comparing the contents of the tax table memory 2-4 which have been set in the above manner with the contents of the actual tax table, the operator instructs the CPU1 to issue a setting/checking report as represented in FIG. 13. As a result, a setting/checking report issuing process operation defined in a flow chart of FIG. 12 is started to be executed. Then, the CPU1 calculates a "FROM"-value, a "TO"-value, and a "TAX"-value based on the respective difference values stored in the tax table memory 2-4, and also prints out these values to thereby issue a setting/checking report (see FIG. 13).

In this flow chart of FIG. 12, the CPU1 clears the content of the BP pointer 2-7, and clears a cycle number of a cycle counter "F" provided in the work memory 8 (step D1). Next, as indicated in FIG. 13, after a header portion such as present day/date, and a checking symbol (x) are printed out (step D2), a calculation is made of "0.00" as initial values of the "TO"-value and the "FROM"-value (step D3).

Under this condition, after the "FROM"-value ("0.00") is printed out (step D4), a difference value is read out from the tax table 2-4 indicated by the BP pointer 2-7 (step D5). This difference value is added to the previously accumulated difference value. The added difference value obtained "TO"-value (step D6). Now, "10" is read as the first difference value from the tax table 2-4. At this time, since the accumulated value of the difference values is equal to "0", "0.10" is calculated as the "TO"-value. Then, after this "TO"-value of "0.10" and the "TAX"-value of "0" are printed out (step D7), the content of the BP pointer 2-7 is updated (step D8). As a result, a check is made as to whether or not the difference value has been stored at a position of the tax table 2-4 pointed out by the BP pointer 2-7 (step D9). If YES, then a calculation is made of "TO-value +difference value", and "TO-value+0.01". These "TO-value+difference value" and "TO-value+0.01" are recognized as a "FROM"-value and a "TO"-value, respectively. A further calculation is made of "TAX-value+0.01", and this resultant value is recognized as a "TAX"-value (step D10). Then, another check is made as to whether or not the newly calculated TAX value is equal to such a value multiplied by 10 (step D11). Now, since the newly calculated TAX value is "0.01", the process operation is returned to the step D4. At this step D4, the FROM-value, the TO-value, and the TAX-value are printed out. In this case, the "FROM"-value becomes "0.11", the "TO"-value becomes "0.24", and the "TAX"-value becomes "1" (implies 0 dollar 01 cent).

When the value of the "TAX"-value becomes "10" by repeatedly performing a similar process operation (step D11), the print paper is line-fed by 1 line in order to readily observe the printed content (step D12). Then, the process operation is returned to a step D4. The respective difference values are sequentially read from the tax table 2-4 to thereby calculate the "FROM"-value, "TO"-value, and the "TAX"-value and print out these values. If the final difference value of the cyclic patterns is exceeded, since no difference value is stored (step D9), then 1 cycle of the non-cyclic patterns and the cyclic patterns is completed. Subsequently, in order to designate such a cyclic pattern from which the non-cyclic pattern is removed, the quantity of the non-cyclic patterns contained in the tax table memory 2-4 is set to the BP pointer 2-7 (step D13), and further "1" is added to the cycle number (step D14). A check is made as to whether or not the added value reaches 10 cycles (step D15). At this time, the cycle number is updated from "0" to "1". However, since it is so detected that the added value is smaller than 10 cycles, the process operation is advanced to a step D10. At this step D10, a similar process operation is repeatedly performed. As a consequence, when the printing operations about 10 cycle data as to the cyclic patterns are accomplished, the CPU1 instructs the printing unit 8 to print out "end of printing" and to issue a setting/checking report (step D16).

As previously described, since the setting/checking report issued in the above manner is identified with the actual tax table, the operator can readily confirm as to whether or not the set content of the tax table memory 2-4 is correct. If the set content is correct, then this set content becomes valid.

PLU REGISTERING PROCESS

Figure 14:
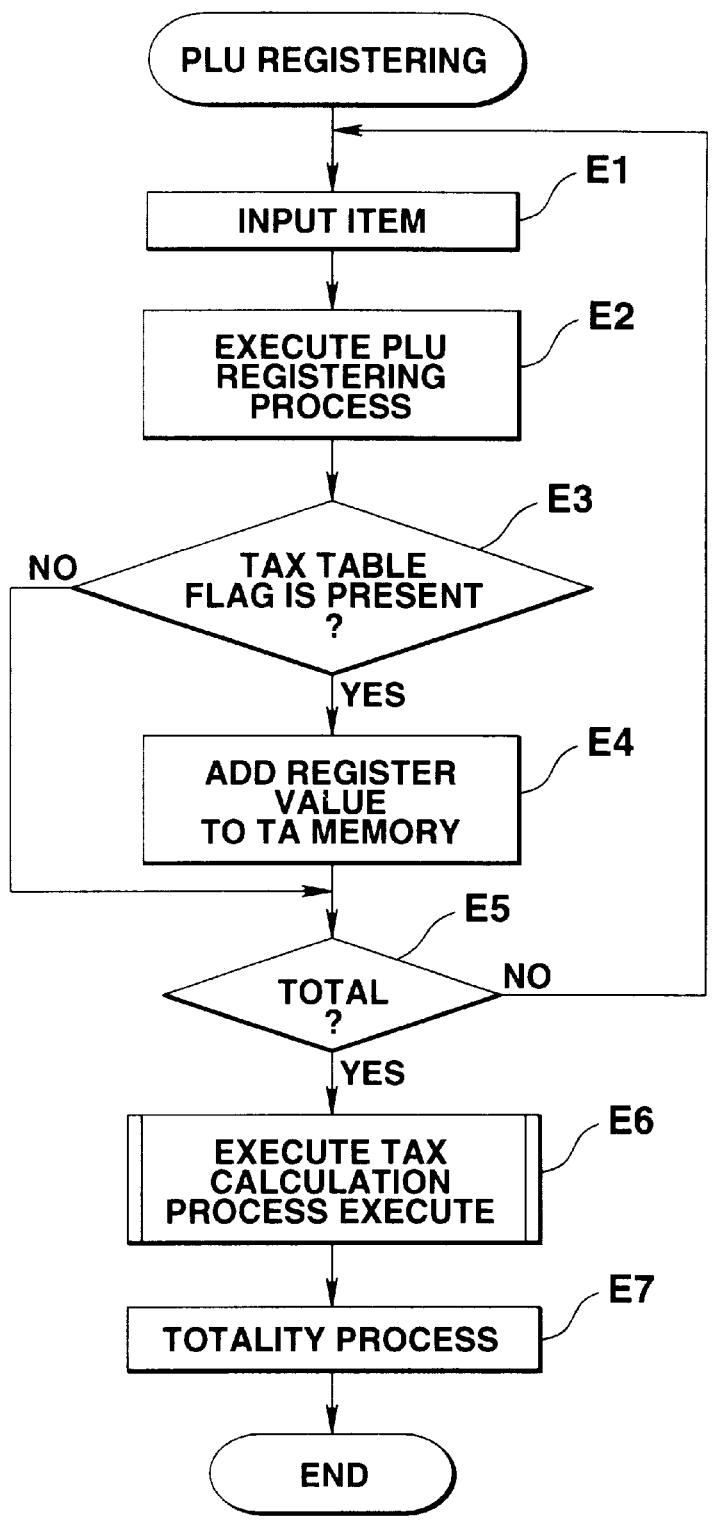
FIG. 14 is a flow chart for describing operations when PLU is registered.

FIG. 14 is a flow chart for describing process operation when PLU (Price Look Up) is registered. It should be understood that since this PLU registering process operation is basically similar to the normal process operation, this process operation will now be simply explained.

Now, when an item is entered, namely sales data about sorts of merchandise is entered (step E1), the content of the PLU memory 2-2 corresponding to the relevant merchandise is updated, and the PLU registering operation such as receipt/journal printing operation is carried out (step E2). Now, a check is done as to whether or not a tax table flag is set to the PLU memory 2-2 in accordance with this relevant merchandise, namely whether or not the registered goods corresponds to taxable merchandise (step E3). If the registered goods is such taxable merchandise, then a sales amount thereof is totalized in the TA memory 2-3 (step E4). Such a registering operation is executed every time the sale data about the sort of merchandise is inputted. Then, when the total key is manipulated when the registering operation for a single transaction is accomplished (step E5), a TAX calculation process operation (step E6) for calculating a tax amount with respect to a sales total amount of the taxable merchandise is carried out, and thereafter a totaling process is carried out (step E7).

TAX CALCULATING PROCESS

Figure 15:
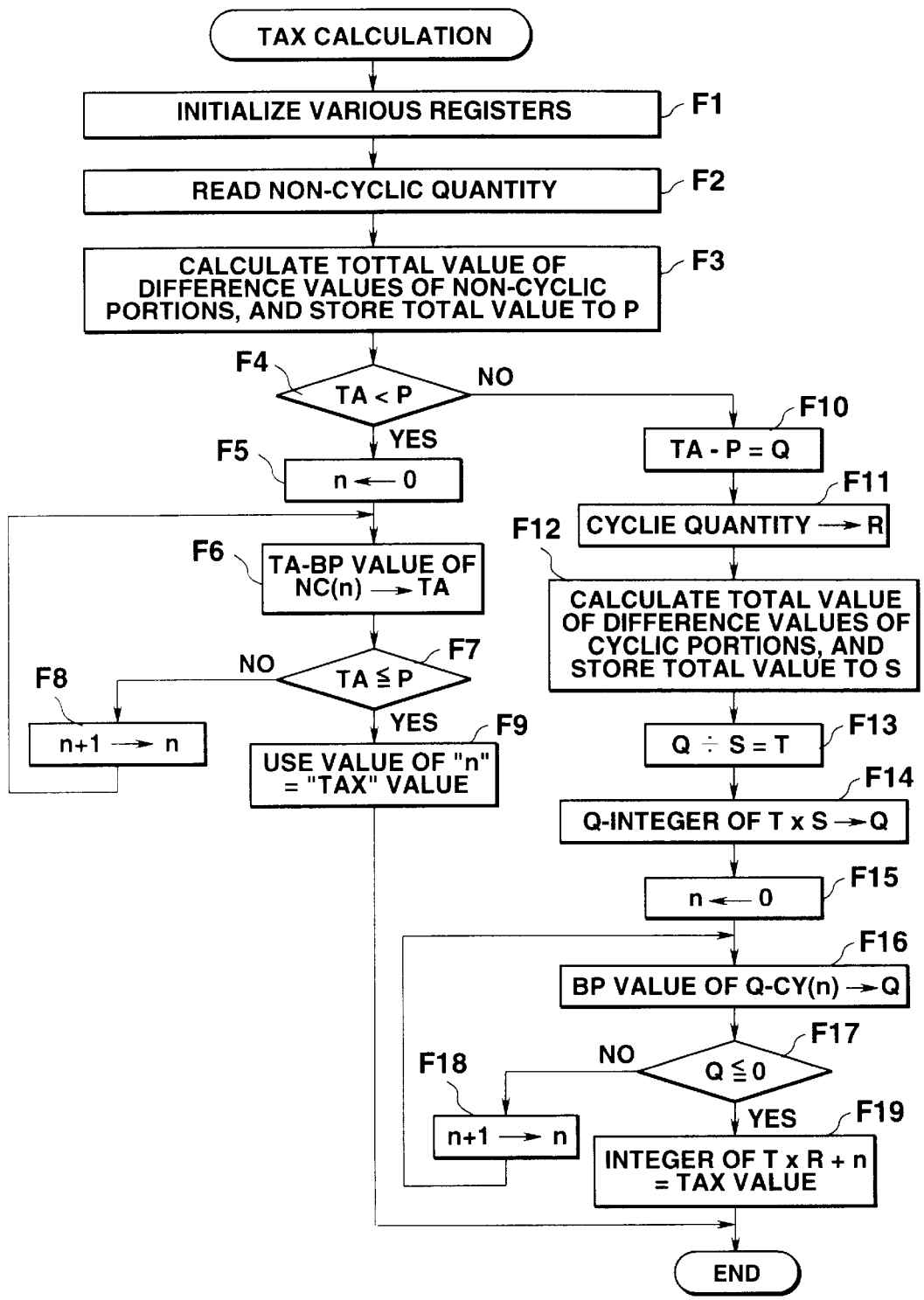
FIG. 15 is a flow chart for explaining a tax calculation process operation defined at a step E6 of FIG. 14.

FIG. 15 represents a flow chart for describing the above-described TAX calculating process (step E6) more in detail.

First, all of contents of P register to S register for calculating TAX values are cleared which are provided in the work memory 2-8 (step F1). Next, the number of non-cyclic pattern is read out from the tax table memory 2-4 (step F2), and also difference values corresponding to the number of non-cyclic patterns are read out from a head position of the tax table memory 24. Then, a total amount is calculated, and this total amount is set to the P register as a total value of the difference values of the non-cyclic patterns (step F3). Thereafter, the sales amount TA of the taxable merchandise is read from the TA memory 2-3 so as to be compared with the value of the P register (step F4). If TA<P, then it can be judged that this sales amount is located within the price range corresponding to the non-cyclic patterns. Accordingly, after the read address "n" of the work memory 2-8 is set to "0" (step F5), the tax table memory 2-4 is accessed based on this read address "n" to thereby send the difference value (namely, BP value of NC(n)) of the non-cyclic pattern. Then, a calculation is carried out as to "TA−BP value of NC(n)", and the calculation result is set to the TA memory 2-3 (step F6). As a result, if it is not TA≦0 (step F2), then "1" is added to the read address "n" (step F8). Again, the tax table memory 2-4 is accessed to execute the calculation of "TA−BP value of NC(n)" (step F6). To the contrary, if TA≦0 (step F7), then the read address "n" obtained at this time is determined as the present tax amount (step F9).

On the other hand, when it is not equal to TA<P (step F4), it is so judged that the sales amount TA is located within the price range corresponding to the cyclic pattern. Accordingly, a calculation of "TA−P" is executed, and the calculation result is set to the Q register (step F10). Then, the number of cyclic patterns is calculated by subtracting the number of non-cyclic pattern from a total number of difference values, and this calculated number is set to the R register. Next, the respective difference values of the cyclic patterns are successively added to each other in order to obtain a total amount of the difference values. After this total amount is set to the S register (step F12), another calculation of "Q/S" is performed. This calculation result is set to the T register (step F13). In this case, an integer saved in the T register will constitute the cycle number for indicating which cycle number of the cyclic pattern. Next, another calculation of "Q—integer of T×S" is performed. The calculation result is set to the Q register (step F14), and a similar process operation (defined from step F15 to step F18) to the above-described process operation defined by the step F5 to the step F8 is executed. That is, after the read address "n" of the work memory 2-8 is set to "0" (step F15), the tax table memory 2-4 is accessed based on this read address "n" to thereby read the difference value (namely, BP value of CY(n)) of the cyclic pattern. Then, a calculation is carried out as to "Q−BP value of CY(n)", and the calculation result is set to the TA memory 2-3 (step F16). As a result, if it is not Q≦0 (step F17), then "1" is added to the read address "n" (step F18). Again, the tax table memory 2-4 is accessed to execute the calculation of "Q−BP value of CY(n)" (step F16). To the contrary, if Q≦0 (step F17), then another calculation of "integer of T×R+n" is carried out to calculate a tax amount (step F19).

In the first electronic cash register with the above described arrangement, functioning as the sales data processing apparatus, only a portion of the contents described in the tax table (tax amount list) in which the price ranges of the taxable subjects are sectioned with respect to the tax amounts is merely inputted, so that the difference values of the respective price ranges can be automatically calculated. As a consequence, the difference values are no longer manually calculated, and the difference value calculating works can be done in a very high efficiency, as compared with the conventional apparatus.

Also, since the difference values of the non-cyclic patterns and the difference values of the cyclic patterns can be automatically recognized by analyzing the respective difference values automatically calculated in the above manner, there is no need that the operator must discriminate the non-cyclic patterns from the cyclic patterns, as compared with the conventional apparatus. The work efficiency can be further increased. In this embodiment, the cyclic pattern recognizing process operation is carried out every time the data is entered. In such a case that the cyclic pattern can be recognized under normal condition, since this normal cyclic pattern recognizing operation is notified, no further data is required to be entered. That is, it is sufficient to enter such data corresponding to at least two cycle data about the cyclic patterns until the cyclic patterns are recognized. Also, in such a case that even when a preselected amount of data is entered, the cyclic patterns could not be correctly recognized, since this fact is notified so as to prohibit further data entry, it is possible to avoid excessive input of the data.

Moreover, the difference value series from a certain position up to the position separated from the first position more than a preselected number (more than 6) are determined as the cyclic pattern judging subjects, and thereafter the cyclic pattern recognizing process is carried out. Therefore, this recognizing process operation can be effectively carried out. In other words, the recognizing process operation is repeatedly executed until the cyclic pattern judging subject is determined. At the time when the cyclic pattern judging subject is determined, the comparing operation is carried out while setting the difference value series. Accordingly, the processing speed can be increased.

In addition, when the confirmation is made of the set content of the tax table memory 2-4, since the "FROM"-value, the "TO"-value, and the "TAX"-value are calculated from the difference values and then the checking report is issued, the content of this checking report is printed out in a similar print format to that of the actual tax table. Accordingly, it is possible to easily confirm the content of the report. At this time, since the data about the 10 cycle portions of the cyclic patterns are printed out, this confirmation about the report content can be more correctly done.

SECOND ELECTRONIC CASH REGISTER

Figure 16:
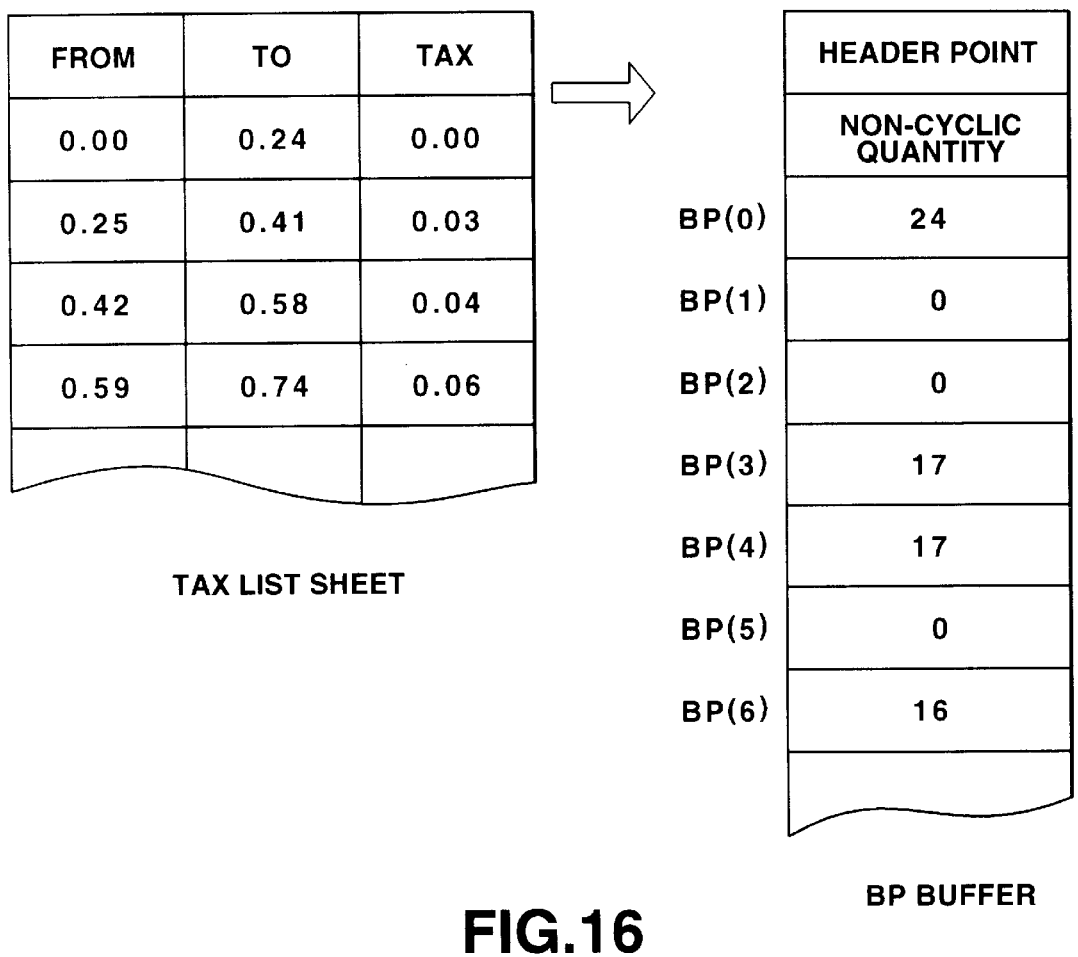
FIG. 16 schematically shows a content of a tax table, and difference values calculated/stored in a BP buffer 2-6 an electronic cash register according to a second embodiment of the present invention.
Figure 17:
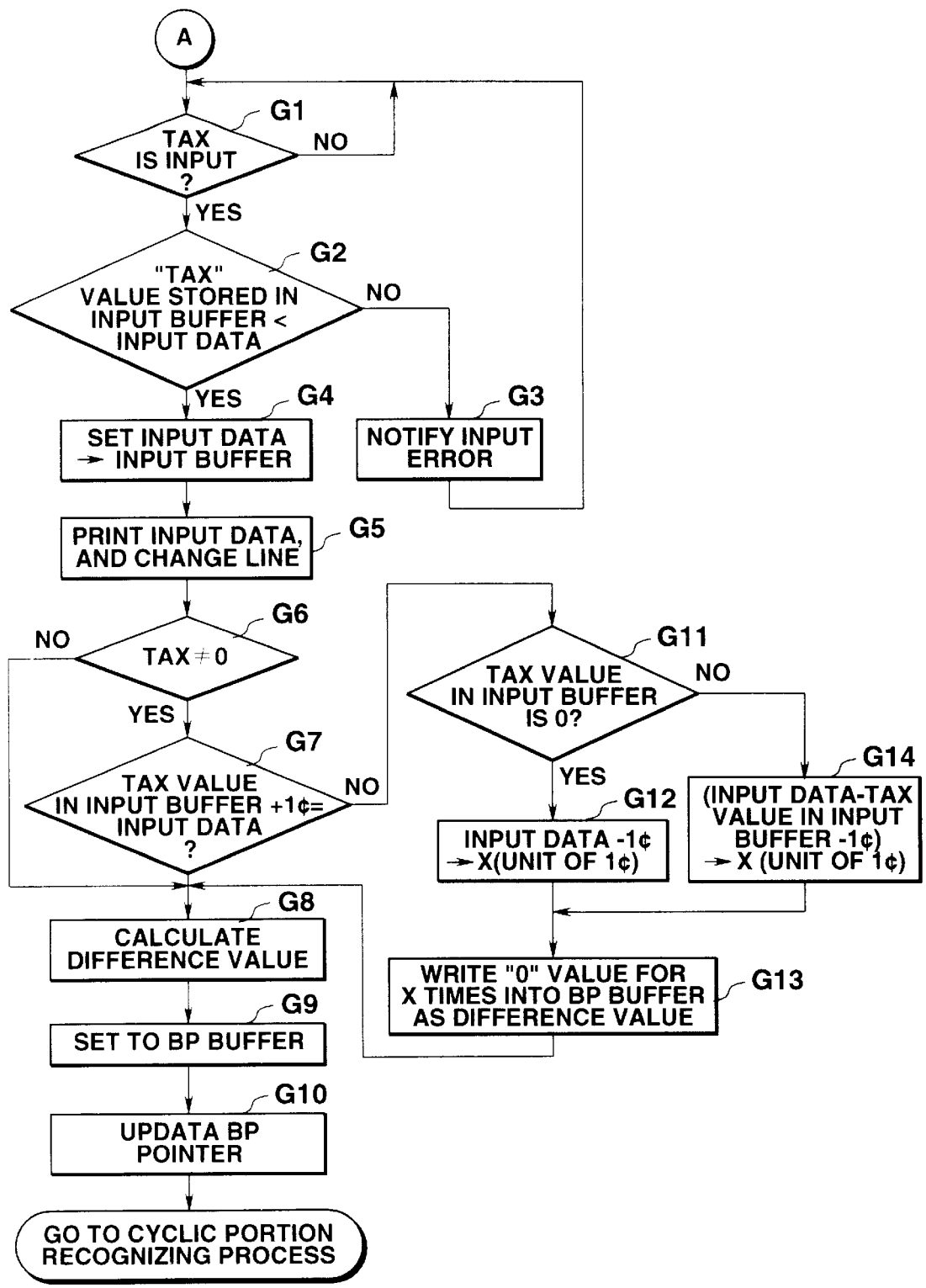
FIG. 17 is a flow chart for describing a major operation of a tax table input setting process executed in the second embodiment.

Referring more to FIG. 16 and FIG. 17, and electronic cash register according to a second embodiment of the present invention will be explained. It should be noted that the above-explained first embodiment mode employs such a tax table that the "TAX"-value is proportionally increased every 1 cent in correspondence with the price range of the taxable subject, whereas this second embodiment mode employs another tax table such that the "TAX"-value is not proportionally increased, and introduces another calculation method of difference values in this different tax table.

FIG. 16 schematically illustrates a tax table in which the "TAX"-value is not proportionally increased, and also difference values calculated by entering the contents described in this tax table. FIG. 17 is a flow chart for describing a major process operation of the second embodiment. That is, this major process operation of the second embodiment may be replaced by the process operations defined from the step A13 to the step A23 of FIG. 7. Since the process operations defined by the step Al to the step A13 and the step A23 to the step A27 are basically similar to these of FIG. 7, these process operations are omitted from FIG. 17.

In the flow chart of FIG. 17, under input waiting condition of a "TAX"-value (step G1), when the "TAX"-value is inputted, an input checking operation thereof is carried out. That is, a check is done as to whether or not the presently inputted "TAX"-value is larger than the "TAX"-value saved in the input buffer 2-5 (step G2). If this condition is not satisfied, then the CPU1 notifies "input error" (step G3), and thus the system operation is brought into an input waiting state of the "TAX"-value (step G1). Conversely, if the correct data capable of satisfying this condition is entered, then the presently inputted TAX-value is set as an input "TAX"-value into the input buffer 2-5 (step G4), and further this input "TAX" value is printed on a receipt, and this receipt is line-fed by 1 line (step G5). First, when "0" is inputted as the "TAX"-value (step G6), a difference value is calculated in a manner similar to the previous manner as defined at the step A20 to the step A22 shown in FIG. 7, and this calculated difference value is set to the BP buffer 2-6. Also, the BP pointer 2-7 is updated (steps G8–G10). In this case, "24" is set as the difference value to the BP buffer 26.

Next, when "0.03" is inputted as the "TAX"-value of the inputted table parameter, a judgement is made at the step G2 that this inputted value corresponds to the correct data, and further at the step G6 that the "TAX"-value is not equal to 0. Another check is made as to whether or not a value obtained by adding "0.01" to the inputted "TAX" value stored in the input buffer 2-5 is equal to the presently inputted TAX value (step G7). Now, since "0.03" (3 cents) larger than 2 cents is entered, another check is made as to whether or not the inputted "TAX" value stored in the input buffer 2-5 is equal to "0". At this time, since the inputted "TAX" value saved in the input buffer 2-5 is equal to "0", a calculation is made of such a value "X" (in unit of cent) by subtracting "1" cent from the presently inputted "TAX" value "0.03" (3 cents). This calculated value is set to the X register (step G12). While updating the BP pointer 2-7, "0" is written as the difference value into a position of the BP buffer 2-6 pointed by this BP pointer 2-7 (step G13). Then, the system operation is advance to process operations defined from a step G8 to a step G10.

Subsequently, when "0.04" is inputted as the inputted "TAX" value of the table parameter, it is so judged at a step G7 that this inputted "TAX" value is larger than the previous "TAX" value by 1 cent, and then the process operation is advanced to the step G8 up to the step G10. When "0.06" is inputted as the inputted "TAX" value of the table parameter, it is so judged at the step G7 that this "TAX" value is larger than the previous "TAX" value by 2 cents, and then the process operation is advanced to the step G11. In this case, since "0.04" is set as the "TAX" value to the input buffer 2-5, the process operation is advanced to a step G14. At this step G14, the "TAX" value "0.04" saved in the input buffer 2-5 is subtracted from the presently inputted "TAX" value "0.06", and also such a value X (in unit of cent) "1" is calculated by further subtracting "1" cent from this value "0.02". While updating the BP pointer 2-7, "0" is written as a difference value into the BP buffer 2-6 pointed out by this BP pointer 2-7 (step G13). Thereafter, the system operation is advanced to process operations defined from the step G8 to the step G10, so that the contents of the BP buffer 2-6 are indicated as in FIG. 16.

As previously described, in the case that the tax amount is not proportionally increased every 1 cent, since "0" is written into the BP buffer 2-6 preselected times, the difference value series are made in a similar sequence to the above-described sequence established when the tax amount is proportionally increased every 1 cent. Thus, the difference values "24", "0", - - - , "16" correspond to the tax amounts "0.00", "0.01", "0.02", - - - , "0.06". Since the content of this BP buffer 2-6 is set to the tax table memory 2-4, the tax amounts can be obtained by a similar TAX calculation process to that for such a case that the tax amount it proportionally increased.

THIRD ELECTRONIC CASH REGISTER

Figure 19:
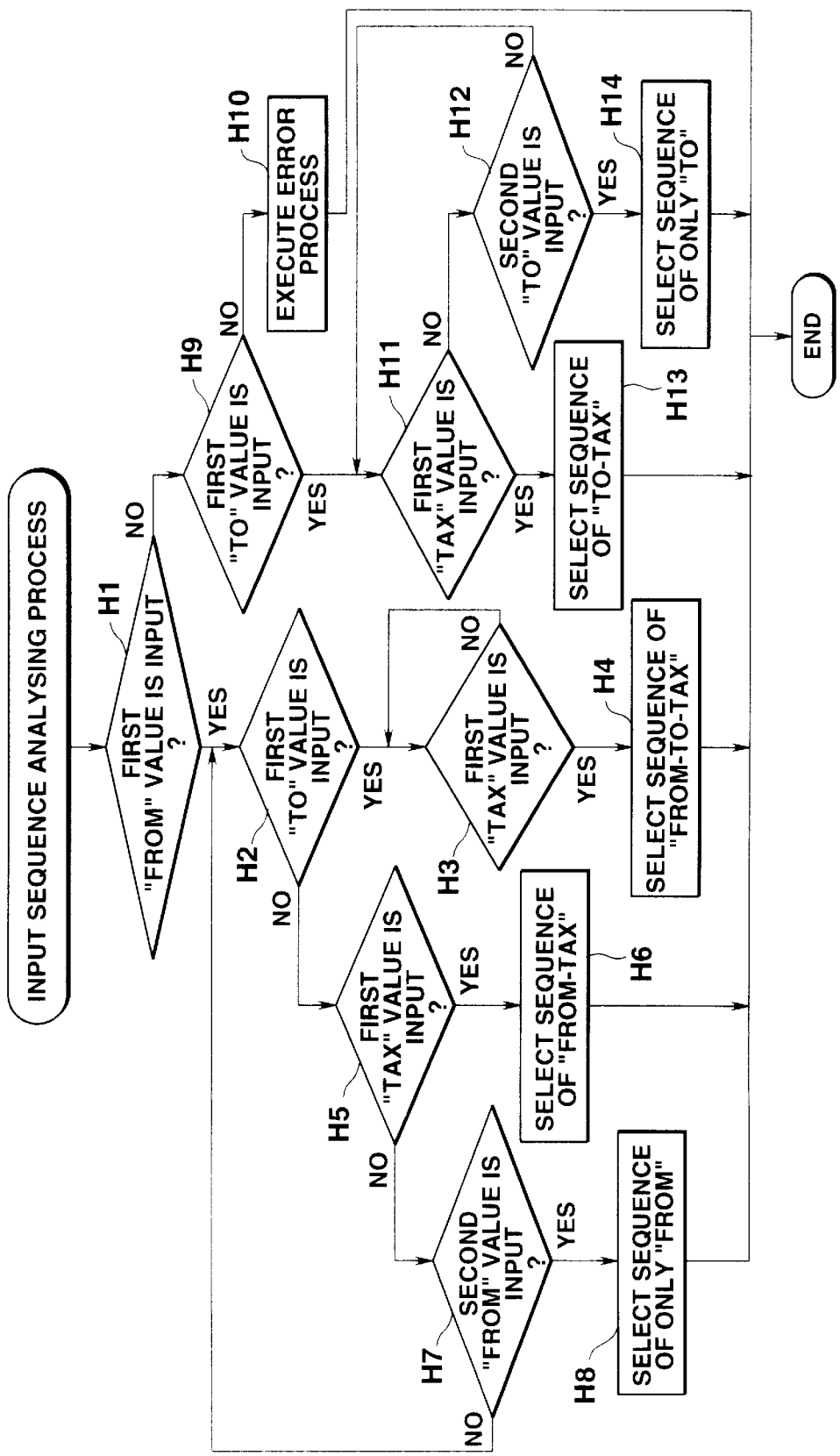
FIG. 19 is a flow chart for describing an input sequence analysis process executed in the third embodiment.

Next, an electronic cash register according to a third embodiment of the present invention will now be explained with reference to FIG. 18 to FIG. 21. This third embodiment has a feature such that any types of tax tables can be processed. In FIG. 18, there are shown various different types of tax tables. That is, FIG. 18A indicates a tax table in which "FROM" values, "TO" values, and "TAX" values are made in correspondence with each other. FIG. 18B shows another tax table in which "TO" values correspond to "TAX" values. FIG. 18C represents another tax table in which "TO" values correspond to "FROM" values. FIG. 19 is a flow chart for describing an input sequence analyzing process operation capable of analyzing how a content described in a tax table is inputted in accordance with which input sequence selected from 5 sorts of predetermined input sequences. It should be understood in this third embodiment that 5 sorts of input sequences are given as a combination of the "FROM"-value and the "TAX"-value; only the "FROM"-values; another combination of the "TO"-value and the "TAX"-value; and only the "FROM"-values in addition to the above-described combination of the "FROM"-value, the "TO"-value, and the "TAX"-value. The CPU1 may analyze how data is entered in accordance with any one of these 5 input sequences when the data input is commenced.

That is, in such a case that after the first "FROM"-value has been entered (step H1), the first "TO" value is inputted (step H2), the system operation waits for the entry of "TAX" value (step H3). In this case, when the first "TAX" value is inputted, the CPU1 analyzes that the input sequence is defined from the "FROM"-value via the "TO"-value to the "TAX"-value and thus selects this input sequence (step H4). Also, in the case that after the first "FROM"-value has been entered (step H1), no "TO"-value is inputted (step H2) but the subsequently inputted data corresponds to the first "TAX"-value (step H5), the CPU1 analyzes that the input sequence is defined from the "FROM"-value to the "TAX"-value, and then selects this sequence (step H6). On the other hand, in the case that after the first "FROM"-value has been entered (step H1), neither the "TO"-value, nor the "TAX"-value is inputted (steps H2 and H5) but the subsequently inputted data corresponds to the second "FROM"-value (step H7), the CPU1 analyzes that the input sequence is defined from only the "FROM"-value and then selects this sequence (step H8). Also, in such a case that the first "FROM"-value is not inputted (step H1), the CPU1 checks as to whether or not the first "TO" value is inputted (step H9). In this case, if neither the first "FROM"-value, nor the "TO"-value is inputted, but the "TAX"-value is entered, this input sequence is processed as an input error (step H10). However, when the first "TO"-value is inputted, the system operation is brought into an input waiting condition until the first "TAX" value is subsequently inputted (step H11), or the second "TO" value is entered (step H12). Now, when the first "TAX"-value is inputted, the CPU analyzes that the input sequence is defined from the "TO"-value to the "TAX"-value, and then selects this sequence (step H13). However, when the second "TO"-value is entered, the CPU1 analyzes that the input sequence is defined only from the "TO"-value, and then selects this sequence (step H14).

When the data input operation is commenced, a selection can be made of the following sequences by analyzing the input sequence thereof, i.e., the sequence from the "FROM"-value, the "TO"-value and the "TAX"value; the sequence from the "FROM"-value, "TAX"-value; the sequence only from the "FROM"-value; the sequence from the "TO"-value, the "TAX"-value; and the sequence only from the "TO"-value. The subsequent data may be inputted in accordance with the selected sequence. It should be understood that even while executing such an input sequence analyzing process operation, the input checking process is carried out to check whether or not the input data is the correct data, and further the writing process of the input buffer 2-5 and also the difference value calculating process are carried out. FIG. 20 and FIG. 21 conceptionally show the writing process to the input buffer 2-5, and the difference value calculating process, depending upon each of the input sequences. That is, FIG. 20A shows a process content corresponding to the sequence from the "FROM"-value to the "TAX"-value. FIG. 20B shows a process content corresponding to the sequence only from the "FROM"-value. FIG. 20C indicates a process content corresponding to the sequence from the "TO"-value to the "TAX"-value. FIG. 20D indicates a process content corresponding to the sequence only from the "TO"-value. Since the process content corresponding to the sequence from the "FROM"-value via the "TO"-value to the "TAX"-value is similar to that of the first embodiment, this process content is omitted.

First, as an input condition in the sequence from the "FROM"-value to the "TAX"-value shown in FIG. 20A, the "TAX"-value is such a value incremented every 1 cent. Assuming now that a first "FROM"-value "0.00" and a first "TAX"-value "0.00" are inputted, the input data are written into the relevant positions of the input buffer 2-5. When the next "FROM"-value "0.11" and the next "TAX"-value "0.01" are inputted, "0.10" is calculated by subtracting 1 cent from the inputted "FROM"-value. This calculated value is written as the preceding "TO" value into the input buffer 2-5, and also the presently inputted "FROM"-value and "TAX"-value data are written into the relevant positions of the input buffer 2-5. Then, such a value "10" obtained by subtracting the one preceding "TO"-value (in this case, "0.00") from the present preceding "TO"-value is written into the BP buffer 2-6 as a first difference value BP(0). When a "FROM"-value "0.25" and a "TAX"-value "0.02" of the next parameter table are inputted, such a value "0,24" obtained by subtracting 1 cent from the inputted "FROM"-value is written as the preceding "TO"value, and also the presently inputted data is written into the relevant position of the input buffer 2-5. Then, such a value "14" obtained by subtracting one preceding "TO"-value "0.10" from the present preceding "TO"-value "0.24" is written as a next different point BP(2) into the BP buffer 2-6. Subsequently, a similar operation is repeatedly performed every time the "FROM"-value and the "TAX"-value are inputted.

Also, in the sequence only from the "FROM"-value shown in FIG. 20B, an input condition is given as follows. The "TAX"-value is such a value incremented every +1 cent, and the first "TAX"-value is equal to "0.00." In this case, when the first "FROM"-value is inputted, this value is written into the input buffer 25. When the next "FROM"-value is entered, such a value obtained by subtracting 1 cent from the presently inputted "FROM" value is written as the preceding "TO"value, and "0.01" is written as the "TAX" value into the input buffer 2-5. In this case, "10" is calculated as a first difference value BP(0). When the "FROM"-value of the next parameter table is entered, after the preceding "TO" value is calculated, "14" is calculated as the next difference value BP(1) by subtracting one preceding "TO"-value from this value.

In the sequence from the "TO"-value to the "TAX" value shown in FIG. 20C, no specific condition is made as the input condition of the "TAX"-value. Thus even an arbitrary "TAX"-value may be inputted. In this case, when the "TO"-value and the "TAX"-value are inputted, these values are written into the relevant positions of the input buffer 2-5. The one preceding "TO"-value is calculated as the present preceding "TO"-value. Then, similar to the above case, "10" is calculated as the difference value BP(0), and "14" is calculated as BP(1).

Furthermore, in the sequence only from the "TO" value shown in FIG. 20D, the input condition of the TAX value is similar to that of the sequence only from the "FROM"-value shown in FIG. 20B. Then, one preceding "TO"-value is obtained as the present preceding "TO"-value, and also the difference values BP(0) and BP(1) are obtained in a similar manner.

As previously described, in this third embodiment, since the various sequences are prepared for any types of tax tables, the proper input process operations for the various types can be carried out. Also, when the data input operation is commenced, this input sequence is analyzed to automatically select the relevant sequence. As a result, the operator need not previously select/designate the desirable sequence, but merely enters the contents described in the tax table, so that the workloads given to the operator can be greatly reduced.

MODIFICATIONS

In the above-explained embodiments, the difference values are calculated while using the "TO"-value as the basic value. Alternatively, the difference values may be calculated while using the "FROM"-value as the basic value. Although the number of non-cyclic patterns is set to the table memory 2-5, the number of cyclic patterns may be set. Furthermore, in the cyclic pattern recognizing process, a predetermined quantity used to determine the cyclic pattern judging subject is selected to be 6 in the first embodiment. Alternatively, any number may be employed, e.g., 12.

In the above-described embodiments, the present invention have been applied to the stand alone type electronic cash registers, but may be applied to such a communication system as a POS system. In this case, the content described in the tax table is inputted on the side of a host computer in order to calculate the difference values. This difference value is analyzed so as to recognize the cyclic pattern and the non-cyclic pattern, which are set into the tax table memory. Then, the content of this tax table may be transferred to the respective electronic cash registers provided on the terminal side. Also, a master/slave type POS system, the content of the tax table memory set into the electronic cash register on the master side may be transferred to the electronic cash registers on the slave side.

What is claimed is:

1. A sales data processing apparatus comprising:

an input device;

difference value calculating means for calculating a difference value between a presently entered one of input values and another input value entered immediately before said presently entered input value every time a preselected value of an upper limit value and a lower limit value is entered by said input device, both said upper limit value and said lower limit value defining a sales amount range for a taxable amount, said sales amount range being segmented based on respective tax amounts on a tax amount list;

difference value storage means for sequentially storing the difference values calculated by said difference value calculating means;

difference value series defining means for defining as a reference difference series, a difference value series produced when a predetermined number of said difference values are stored in said difference value storage means;

difference value comparing means for repeatedly performing a comparing operation between: (i) each of difference values which are stored in said difference value storage means after said difference value series defining means defines said reference difference value series, and (ii) respective difference values contained in said reference difference value series;

difference value series pattern discriminating means for discriminating a first difference value series portion of said difference value series from a second difference value series portion of said difference value series based on comparison results of said difference value comparing means, said first difference value series portion being constituted by difference values whose comparison results indicate non-coincidence, and said second difference value series portion being constituted by difference values whose comparison results continuously indicate coincidence;

setting means for setting said first difference value series portion, a total number of the difference values contained in said first difference value series portion, and said second difference value series portion to a tax table; and tax calculating means for calculating a tax amount with respect to a sales amount using said tax table.

2. The sales data processing system as claimed in claim 1, wherein said difference value comparing means comprises execution reserving means for reserving comparing operations of said difference value comparing means until a preselected number of any one of said upper limit value and said lower limit value, which represents the sales amount range of the taxable amount, is entered by said input means.

3. The sales data processing system as claimed in claim 1, further comprising notifying means for indicating that said difference value series pattern discriminating means has discriminated said second difference value series portion.

4. The sales data processing system as claimed in claim 3, further comprising notifying means for indicating whether or not said difference value series pattern discriminating means is capable of discriminating said second difference value series portion.

5. The sales data processing system as claimed in claim 1, further comprising input control means for controlling said input means to prohibit a further input of at least one of said upper limit value and said lower limit value in such a case that while a preselected number of any one of the upper and lower limit values indicating the sales amount range of the taxable amount is entered by the input means, said difference value series pattern discriminating means is not capable of discriminating said second difference value series.

6. The sales data processing system as claimed in claim 1, further comprising:

designating means for designating a checking report output used to confirm a content set to the tax table;

means for setting an initial value indicative of a tax amount corresponding to a lower limit value of a sales amount range of a first taxable amount when the checking report output is designated by said designating means;

calculating means for calculating upper limit values, lower limit values, and tax amounts, which correspond to each of the sales amount ranges of the taxable amounts, by accumulating each of the difference values contained in the tax amount table and a value incremented in a predetermined unit with respect to an initial value for the set upper limit value and the set lower limit value; and output means for outputting the tax amounts in a report format, which correspond to the upper limit values and the lower limit values of each of the sales amount ranges calculated by said calculating means.

7. The sales data processing system as claimed in claim 6, wherein said calculating means repeatedly calculates the upper limit values, the lower limit values, and the tax amounts thereof a predetermined times, which correspond to the respective sales amount ranges contained in said first difference value series portion stored in said difference value storage means.

8. A sales data processing apparatus comprising:

an input device;

storage means for storing thereinto a taxable amount pattern; and a processor operatively connected to said storage means;

wherein said taxable amount pattern is constituted by an irregularly incremented portion and a regularly incremented portion having a constant cyclic width with respect to an increased tax amount within a sales amount range corresponding to a tax segment of a tax amount list; and wherein said storage means further stores a program capable of controlling said processor to:

repeatedly calculate a difference between respective sales amount ranges of the tax amount list;

set a preselected number of calculated difference values as a reference cycle width series;

sequentially compare, every time a difference value is calculated after said reference cycle width series is set, the calculated difference value with the difference value of said reference cycle width series so as to check an establishment of a coincidence between said calculated difference value and the difference value of said reference cycle width series;

define continuously coincident difference value series portions contained in the reference cycle width series when a difference value of a final series of said reference cycle width series is compared with the calculated difference value; and supply a total number of the defined difference value series portions, and a remaining difference value series portion to the storage means as the taxable amount pattern.

* * * * *